US005777393A

United States Patent [19]

Katoh et al.

[11] Patent Number: 5,777,393

[45] Date of Patent: Jul. 7, 1998

[54] STARTER WITH PINION RETREAT PREVENTING STRUCTURE

[75] Inventors: Masahiro Katoh, Kariya; Takeshi Araki, Nishikasugai-gun; Masami Niimi, Handa; Tsutomu Shiga, Nukata-gun, all of Japan

[73] Assignee: Nippondenso Co., Ltd., Kariya, Japan

[21] Appl. No.: 642,942

[22] Filed: May 6, 1996

[30] Foreign Application Priority Data

| | | | |
|---|---|---|---|
| May 10, 1995 | [JP] | Japan | 7-112119 |
| May 26, 1995 | [JP] | Japan | 7-128646 |
| Feb. 14, 1996 | [JP] | Japan | 8-026549 |
| Apr. 18, 1996 | [JP] | Japan | 8-097064 |

[51] Int. Cl.$^{6}$ .......... F02N 11/08; H02P 9/04

[52] U.S. Cl. .......... 290/48; 290/38 A; 290/38 B; 290/38 D; 74/7 C; 74/7 E

[58] Field of Search .......... 290/38 A, 38 B, 290/38 D, 38 E, 38 R, 48; 74/6, 7 C, 7 E

[56] References Cited

U.S. PATENT DOCUMENTS

| | | | |
|---|---|---|---|
| 1,527,588 | 2/1925 | Kennington | 290/48 |
| 2,233,595 | 3/1941 | Elkin | 290/38 |
| 2,302,325 | 11/1942 | Janes | 290/38 |
| 2,882,421 | 4/1959 | Mendenhall | 290/38 |
| 3,062,966 | 11/1962 | Merriam, Jr. | 290/38 |
| 3,177,368 | 4/1965 | Seilly | 290/48 |
| 3,496,759 | 2/1970 | Buxton | 74/7 |
| 3,868,858 | 3/1975 | Reichardt et al. | 74/712 |
| 3,875,805 | 4/1975 | Toulier | 290/48 |
| 4,855,609 | 8/1989 | Eguchi et al. | 290/48 |

FOREIGN PATENT DOCUMENTS

| | | | |
|---|---|---|---|
| 774405 | 12/1934 | France | 290/48 |
| 57-36763 | 2/1982 | Japan . | |
| 390972 | 4/1933 | United Kingdom | 290/48 |
| 614201 | 12/1948 | United Kingdom | 290/48 |

*Primary Examiner*—Steven L. Stephan
*Assistant Examiner*—Elvin G. Enad
*Attorney, Agent, or Firm*—Cushman Darby & Cushman IP Group of Pillsbury Madison & Sutro LLP

[57] ABSTRACT

A retreat restricting member for restricting the retreat of a pinion in an advanced state of the pinion on an output shaft and in a resulting meshed state of a pinion gear with a ring gear is engaged with a pair of pins rotatably, the pins being each attached to a thrust ring. In a rotation restricting member for restricting the rotation of the pinion, upon meshing of the pinion gear with the ring gear, the front end of a rotation restricting bar is disengaged from a recess of a rotation restricting plate and falls to the rear end side of the thrust ring, thereby releasing the rotation-restricted state of the pinion. Further, engaging portions of the rotation restricting member come into engagement with engaging recesses of the retreat restricting member to hold the posture of the member, thereby inhibiting the retreat of the pinion.

20 Claims, 23 Drawing Sheets

STARTER WITH PINION RETREAT PREVENTING STRUCTURE

BACKGROUND OF THE INVENTION

1. Field of the Invention

The present invention relates to a starter for start-up or cranking of an engine.

2. Related Art

According to a conventional pinion detent structure in a starter for an engine, a pinion is pushed against a ring gear side by operating a lever under the action of a plunger attracting force in an electromagnet switch, to thereby prevent disengagement of the pinion from the ring gear. In this case it is necessary that a relation between the stroke from a rest position of the pinion up to a meshing position with the ring gear and the stroke of the plunger be determined by adjusting the ratio (lever ratio) in moving distance between a force-applied point and a working point of the lever. This means that if the lever ratio is set large, the plunger stroke can be made small, but instead it becomes necessary to create a large plunger attracting force, and that if the lever ratio is set small, the plunger attracting force can be set small, but instead it becomes necessary to provide a large plunger stroke. This point has been an obstacle to the reduction in size of the electromagnet switch.

On the other hand, in Japanese Utility Model Laid-Open No. 57-36763 and Japanese Patent Laid-Open No. 50-18915, there is disclosed a structure wherein by restricting the rotation of a clutch including a pinion, the pinion is allowed to advance toward a ring gear under the action of a helical spline of an output shaft and the action of a rotating force of a starter motor, and after meshing of the pinion with the ring gear, a shaft is pushed out in the radial direction toward the rear end of a clutch adapted to rotate integrally with the pinion, to restrict the retreat of the clutch, thereby preventing disengagement of the pinion from the ring gear. According to this structure, since the moving direction of the pinion and the clutch and the operating direction of the retreat restricting shaft are orthogonal to each other, an electromagnet switch which drives the shaft need not have an attractive force enough to overcome the returning force of the pinion, thus making it possible to reduce the size of the electromagnet switch.

However, in the above-described structure which utilizes the attractive force of the electromagnet switch to drive the shaft, the clutch is supported at only one point in the circumferential direction at the time of restricting the retreat of the clutch in a meshed state of pinion and ring gear, and therefore the pinion-ring gear meshing is performed in an inclined state of the pinion relative to the output shaft. Consequently, there occurs problems such as local wear and the generation of noise. Further, since the rotating force of the pinion is transmitted directly to the shaft, the shaft bends or wears due to follow-up rotation.

SUMMARY OF THE INVENTION

The present invention has been accomplished in view of the above-mentioned circumstances, and it is a primary object of the invention to provide a starter with an improved pinion retreat restricting structure.

It is another object of the present invention to provide a starter wherein, at the time of restricting a retreat of a movable cylindrical member, the movable cylindrical member is prevented from tilting toward an output shaft to thereby prevent local wear, generation of noise, etc.

According to a first aspect of the present invention, first abutting portions of a retreat restricting member are positioned between a first and second parallel lines and tangential to an outer circumference of a helical spline of an output shaft and at positions opposing to each other relative to the output shaft as a center. Further, the first abutting portions respectively in abutment with a movable cylindrical member. As a result, the moments exerting on the respective first abutting portions which tend to incline the movable cylindrical member exert oppositely to cancel out component forces. In particular, since the the first abutting portions are positioned between the first and second parallel lines which are respectively tangential to the outer circumference of the helical spline of the output shaft, the moments which exerts on the first abutting portions can be reduced greatly than in the case where the first abutting portions are outside the first and second tangential lines. Consequently, it is possible to prevent the cylindrical member from tilting relative to the output shaft, thereby preventing deformation of the retreat restricting member, local wear or the generation of noise between the movable cylindrical member and the first abutting portions of the retreat restricting member which are caused by tilting of the movable cylindrical member.

According to a second aspect of the present invention, first abutting portions of a movable cylindrical member respectively abut the movable cylindrical member at least at three locations radially symmetric relative to the axis center of the movable cylindrical member. Therefore, it is highly possible to prevent the movable cylindrical member from tilting relative to the output shaft.

With the axis center of the movable cylindrical member being disposed within a polygonal shape formed by connecting the first abutting portions at three or more locations, freedom of disposition of a retreat restriction member can be increased and designing of arrangement of component parts can be made easier.

Preferably, in the first aspect, the first abutting portions of the movable cylindrical member respectively abut the movable cylindrical member at two locations radially symmetric relative to the axis center of the movable cylindrical member. Therefore, it is highly possible to prevent the movable cylindrical member from tilting relative to the output shaft.

Preferably, in both the first and second aspects, the following features are additionally provided.

A rotatable member is disposed between the movable cylindrical member and the retreat restriction member rotatably relative to the movable cylindrical member. Therefore, the rotating member performs a relative sliding rotation with respect to the pinion gear even upon rotation of the pinion gear, whereby the rotating force of the pinion gear can be prevented from being transmitted to the first abutting portions. Consequently, it is possible to prevent follow-up rotation of the first abutting portions with rotation of the pinion gear.

An operating posture holding member for the retreat restricting member is provided to maintain the advanced state of the movable cylindrical member and hold the operating posture of the retreat restricting member. Therefore, there is no possibility that the retreat restricting member releases retreat-restricting operation of the movable cylindrical member due to vibrations imposed on a starter or the like. Thus, the retreat restricting member can maintain the advanced state of the movable cylindrical member.

The posture holding member is interposed in a space between a stationary member and and the retreat restricting member. Therefore, the posture holding member works as a stop bar to stop retreating of the movable cylindrical member when the movable cylindrical member tends to retreat.

The distance from the pivotal support portion to the second abutting portion of the posture holding member can be set longer than the distance from the pivotal support portion of the stationary member to the first abutting portion of the movable cylindrical member.

This means that on the basis of the principle of the lever the force of the posture holding member for holding the operating posture of the retreat restricting member can be enhanced and converted into the force of the retreat restricting member for restricting the retreat of the movable cylindrical member, thus permitting the posture holding member to be formed using a material lower in strength than in the case of directly restricting the retreat of the movable cylindrical member. The resulting simplification of structure and the use of a material easy to be machined permit reduction in the manufacturing cost.

Further, the retreat restricting member is supported at both ends of the movable cylindrical member with respect to the working point to which the retreating force of the movable cylindrical member is applied, so when the same member flutters in the axial direction (moves back and forth in the axial direction at the time of start-up of the engine) and a pulsative retreating force is exerted on the retreat restricting member, the movable cylindrical member itself flexes and thus can exhibit a buffer action.

With movement of the movable cylindrical member, the retreat restricting member can move generally radially with respect to the support portion of the stationary member as the fulcrum while supported axially within the holding member of a rotary member mounted to the movable cylindrical member. Therefore, for moving to a position for restricting the retreat of the movable cylindrical member, it is not necessary to use any separate member for moving together with the movable cylindrical member. As a result, with a simple structure it is possible to move the retreat restricting member to the position for restricting the retreat of the movable cylindrical member.

With the restriction of rotation of the movable cylindrical member and holding the operating posture of the retreat restricting member can be attained by a single member, it is possible to avoid complication and addition of component parts.

The support portion of the rotatable member has a pair of first projecting portions respectively projecting from the rotatable member to the opposite side of the movable cylindrical member, and a pair of second projecting portions respectively projecting radially inwardly from the paired first projecting portions toward the axis center of the movable cylindrical member. Therefore, the retreat restricting member while being kept axially supported can move in a generally radial direction within the space formed by the first and second projecting portions of the rotatable member and drive easily the retreat restricting member to the position for restricting the retreat of the movable cylindrical member.

The rotation restricting member can be mounted by simply being inserted (slided) into the space.

Moreover, a pair of bent portions which are bent toward the opposite side of the movable cylindrical member are provided on the paired side portions respectively extending from the support portion, so that the bent portion works as the first abutting portion relative to the movable cylindrical member. Therefore, even when the inclination of the retreat restricting member relative to the stationary member is not fixed, the paired bent portions abut the movable cylindrical member in a generally straight line and, as a result, restriction on the retreat of the movable cylindrical member can be performed stably.

An arm member is mounted rotatably in the rotating direction with respect to the movable cylindrical member and engages at one end thereof the same member rotatably on both sides corresponding to generally symmetric positions relative to the axis of the movable cylindrical member. As a result, it is possible to prevent follow-up rotation of the arm member for the movable cylindrical member and prevent tilting of the movable cylindrical member with respect to the output shaft. Thus, it is possible to prevent generation of noise caused by a local wear of the movable cylindrical member and the arm member.

Further, as the movable cylindrical member advances, the arm member is raised up and gets in between the movable cylindrical member and the stationary member, while an arm posture holding member holds the posture of the arm member, whereby the arm member restricting the retreat of the movable cylindrical member can be restricted from retreating due to vibration caused at starting the engine or the like. According to this structure, it suffices for the drive member for driving the arm holding member to generate only a drive force enough to move the arm member to the abutting position to hold the posture of the arm member. In other words, the drive member does not require a drive force sufficient to overcome the returning force of the pinion (retreating force of the movable cylindrical member), so that it is possible to attain the reduction in size of the drive member.

The arm member is raised up axially with advance motion of the movable cylindrical member to gets in toward the axial side of the output shaft while sliding on the stationary member. Consequently, when the movable cylindrical member is in a rest state, the pivotal support portion of the arm member is positioned on the radial side of the output shaft on the stationary member. That is, the arm member is raised up axially only when the movable cylindrical member has moved forward and is interposed between the movable cylindrical member and the stationary member. Therefore, the overall length (axial length) of the starter in a rest state of the movable cylindrical member can be set short.

The operating direction of the arm posture holding member which operates for restricting one end portion of the arm member intersects the direction in which the arm member is pushed out radially of the output shaft on the stationary member, whereby the driving force of the drive member which drives the arm posture holding member can be set smallest. This is suitable for the reduction in size of the drive member.

The electromagnet switch does not require an attracting force enough to overcome the returning force of the pinion gear (retreating force of the movable cylindrical member) and it suffices for it to ensure only a drive force and a drive distance both sufficient to bring the restriction member into abutment with the movable cylindrical member. That is, it is not necessary to ensure a drive force to overcome the retreating force of the pinion gear (retreating force of the movable cylindrical member), nor is it necessary to ensure a drive distance for moving the movable cylindrical member having the pinion gear directly in an axis direction. Therefore, it is possible to utilize the drive of an electromagnet switch which drives a contact for controlling the supply of electric power to the starter motor, thus permitting the use of a small-sized electromagnet switch as a substitute.

The restriction member is connected to the drive member by a connecting member and is moved to the position of abutment with the movable cylindrical member, the disposition freedom of the drive member relative to the starter motor increases (the drive member may be disposed in any position relative to the starter motor) and the loadability to the engine improves.

The electromagnet switch is disposed behind the starter motor to prevent radial rush-out, whereby the loadability to the engine is further improved.

By restricting the rotation of the movable cylindrical member having the pinion gear, even in a type which has no mechanism for advancing a movable cylindrical member through a helical spline operation between the rotating force of a starter motor and an output shaft (e.g., an inertia engagement type starter which uses an inertia of a movable cylindrical member to engage it with an engine ring gear), the retreat restriction can be attained assuredly without causing tilting of the movable cylindrical member relative to the output shaft. Thus, deformation of retreat restricting means, local wear on the movable cylindrical member and the restricting portion of the retreat restricting means, and generation of unusual sound can be prevented.

BRIEF DESCRIPTION OF THE DRAWINGS

Other features in structure, operation and advantages of the present invention will become more apparent to those skilled in the art from the following description when read in conjunction with the accompanying drawings, in which.

DETAILED DESCRIPTION OF PRESENTLY PREFERRED EMBODIMENTS

Various embodiments of a starter according to the present invention will be described hereinunder with reference to the accompanying drawings.

(First Embodiment)

Figure 1:
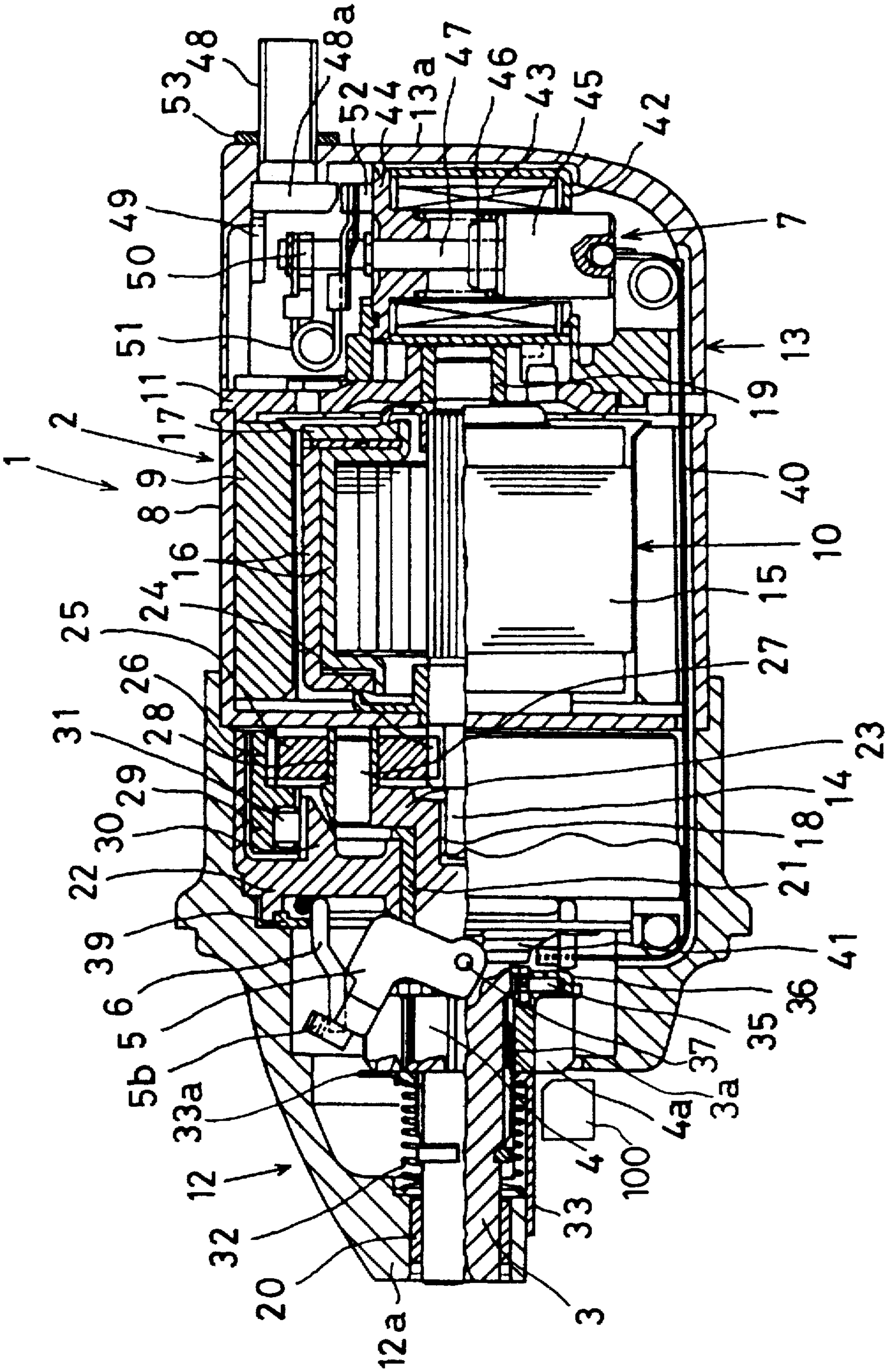
FIG. 1 is a sectional view of the whole of a starter according to a first embodiment of the present invention.
Figure 2:
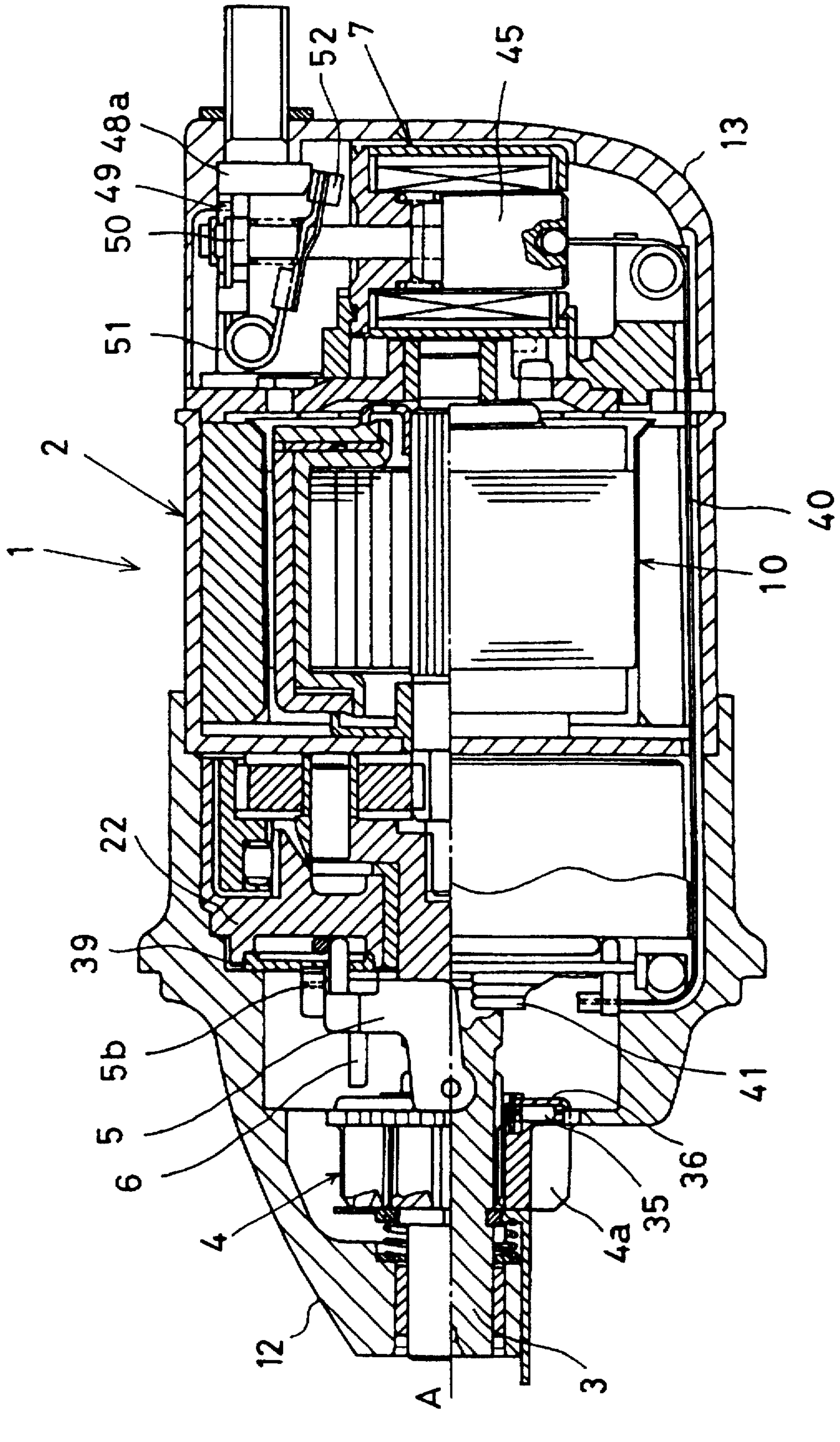
FIG. 2 is a sectional view of the whole of the starter according to the first embodiment.

FIGS. 1 and 2 are sectional views showing the whole of a starter.

The starter of this embodiment, indicated at 1, comprises a starter motor 2 which generates a rotating force when supplied with electric power, an output shaft 3 disposed coaxially with a rotating shaft of the starter motor 2, a rotating force transfer means (to be described later) for transmitting the rotating force of the starter motor 2 to the output shaft 3, a pinion 4 fitted on the outer periphery of the output shaft 3, a retreat restricting member 5 for restricting the retreat of the pinion 4 after meshing of a tooth portion 4*a* (hereinafter referred to as the pinion gear 4*a*) with a ring gear 100 of an engine (not shown), a rotation restricting member 6 for restricting the rotation of the pinion 4 after meshing of the pinion gear 4*a* with the ring gear 100 and until advance by a predetermined distance, and a magnet switch 7 disposed behind the starter motor 2.

(Starter Motor 2)

The starter motor 2 comprises a yoke 8, fixed poles 9, an armature 10, and brushes (not shown). The yoke 8, which is provided in a cylindrical form, is held between a housing 12 and an end cover 13 together with a holder 11 which is disposed on the rear end side (right end side in FIG. 1) of the yoke 8.

The fixed poles 9, formed by permanent magnets for example, are fixed to the inner peripheral surface of the yoke 8 and form a magnet field. As the fixed poles 9, field coils which generate a magnet force when energized may be used in place of permanent magnets.

The armature 10 comprises a shaft 14 serving as a rotating shaft, a core 15 provided on the outer periphery of the shaft 14, coils 16 mounted on the core 15, and a commutator 17 attached to the rear end face of the core 15. In the armature 10, the shaft 14 is disposed behind and coaxially with the output shaft 3, the front end portion of the shaft 14 is supported in a recess rotatably through a bearing 18 which recess is formed in the rear end portion of the output shaft 3, and the rear end of the shaft 14 is supported by the holder 11 rotatably through a bearing 19.

The brushes (not shown) are held by the holder 11 and are each urged to the commutator 17 by means of a spring (not shown) incorporated in the end cover 13.

(Output Shaft 3)

The front end portion of the output shaft 3 is supported rotatably by a bearing portion 12*a* of the housing 12, while the rear end portion thereof is supported rotatably by a center case 22 (the stationary member in the present invention) through a bearing 21. The rear end of the output shaft 3 is provided integrally as a planet carrier 23 in a planetary reduction gear mechanism (to be described later). The center case 22 is fixed to the inner periphery on the rear end side of the housing 12 and covers the outer periphery of the rotating force transfer means.

(Rotating Force Transfer Means)

The rotating force transfer mechanism is composed of a planetary gear reduction mechanism and a one-way clutch. The planetary gear reduction mechanism is a reduction mechanism for decreasing the rotational speed of the starter motor 2 and increasing the output torque of the same motor.

It is composed of a sun gear 24 formed on the front-end outer periphery of the shaft 14, three planetary gears 25 meshing with the sun gear 24, an internal gear 26 meshing with the planetary gears 25, and the planet carrier 23 referred to above. The three planetary gears 25 are each supported by a pin 27 rotatably through a bearing 28, the pin 27 being fixed to the planet carrier 23. In the planetary gear reduction mechanism, as the sun gear 24 rotates together with the shaft 14, each planetary gear 25 meshing with both sun gear 24 and internal gear 26 revolves in the same direction as the sun gear 24 while rotating on its own axis (reverse to the rotation of the sun gear 24), and this revolving force is transmitted to the planet carrier 23 through the pin 27, so that the output shaft 3 rotates.

The one-way clutch supports the internal gear 26 in the planetary gear reduction mechanism so as to be rotatable only in one direction (the direction in which it rotates under the rotation of the engine). The one-way clutch comprises an outer 29, an inner 30, and rollers 31.

The outer 29 is formed in a cylindrical shape integrally on the front side of the internal gear 26. The inner 30 is formed integrally on the rear side of the center case 22 and defines a roller housing (not shown) together with the outer 29. The roller 31, which is accommodated in the roller housing, locks the outer 29 and the inner 30 at the time of transmitting the rotating force of the starter motor 2 to the output shaft 3.

(Pinion 4)

In the interior of the housing 12 the pinion 4 is fitted through a helical spline onto the outer periphery of the output shaft 3 in a position close to the front end of the output shaft and is normally urged backward of the output shaft 3 (rightward in FIG. 1) by means of a spring 32 disposed on the front end side of the pinion 4. The spring 32 urges the pinion 4 through a ring portion 33*a* of a shutter 33 which is fitted on the outer periphery of the output shaft 3 in front of the pinion 4. In interlock with the movement of the pinion 4 the shutter 33 opens or closes an opening portion (not shown) of the housing 12 which opening portion opens on the ring gear side.

Figure 3:
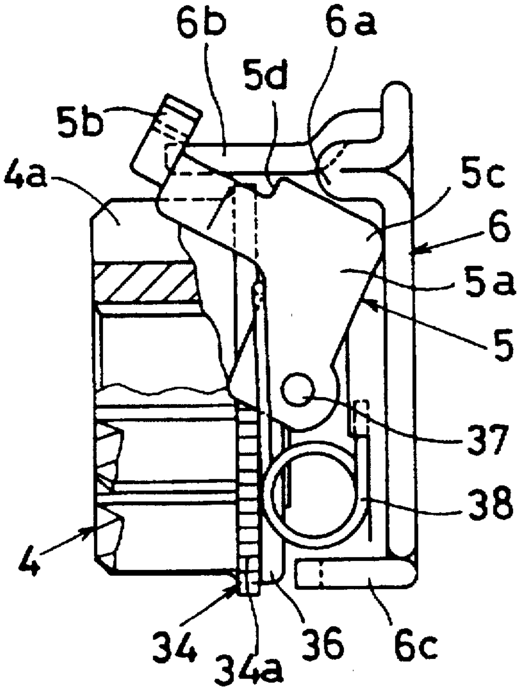
FIG. 3 is a view explanatory of operation, showing a rest state of a pinion in the first embodiment.
Figure 7:
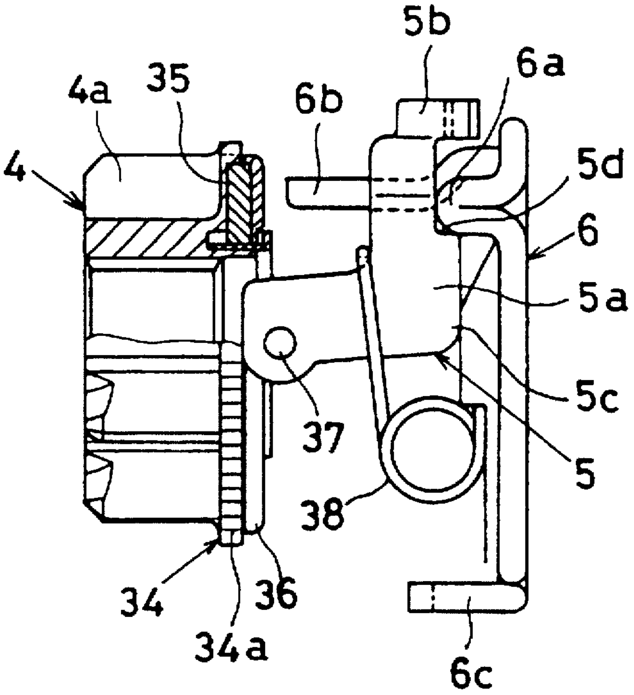
FIG. 7 is a view explanatory of operation, showing an advanced state of a pinion in the first embodiment.

As shown in FIGS. 3 and 7, on the rear end side of the pinion 4 is integrally provided a rotation restricting plate 34 larger in outside diameter than the pinion 4 and having a large number of recesses 34*a* formed in the outer periphery thereof. The number of the recesses 34*a* is larger than the number of teeth of the pinion gear 4*a*.

Further, on the rear end side of the rotation restricting plate 34 is mounted a thrust ring 36 (the rotatable member in the present invention) rotatably in the rotating direction of the pinion 4 through a thrust bearing 35.

(Retreat Restricting Member 5)

Figure 4:
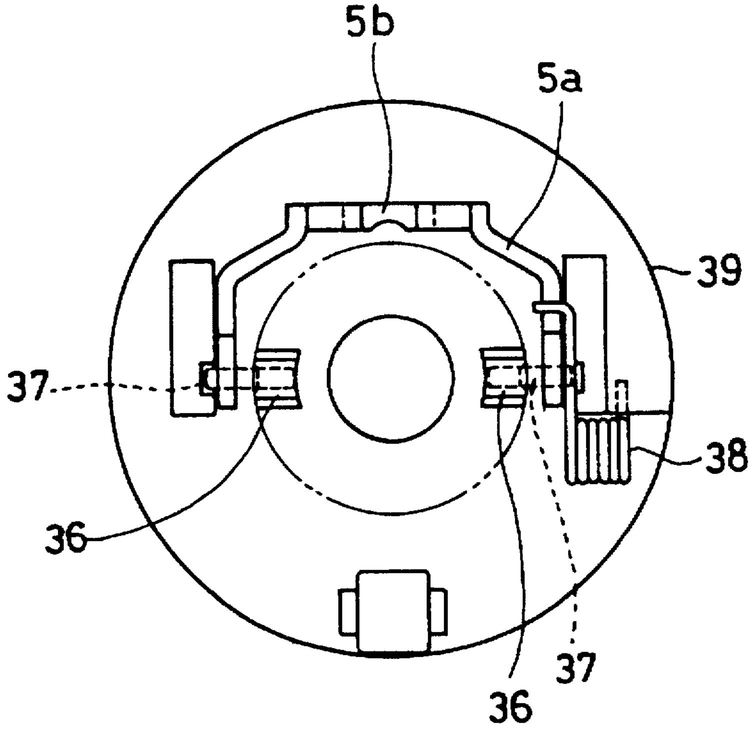
FIG. 4 is a plan view showing a mounted state of a retreat restricting member in the first embodiment.
Figure 5:
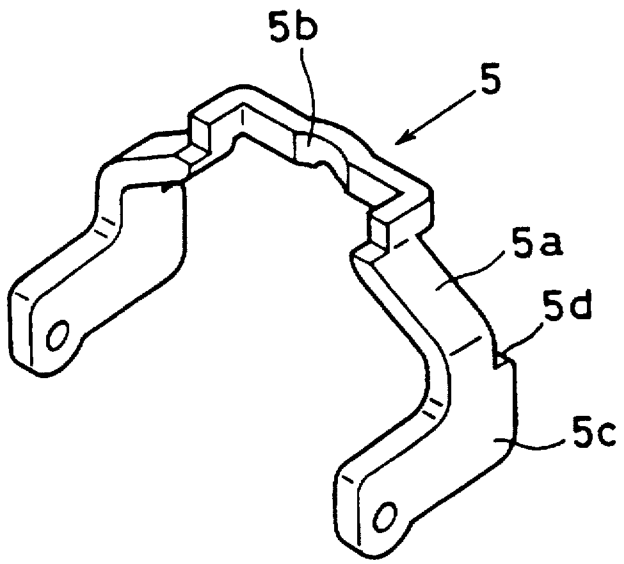
FIG. 5 is a perspective view of a retreat restricting member in the first embodiment.
Figure 8:
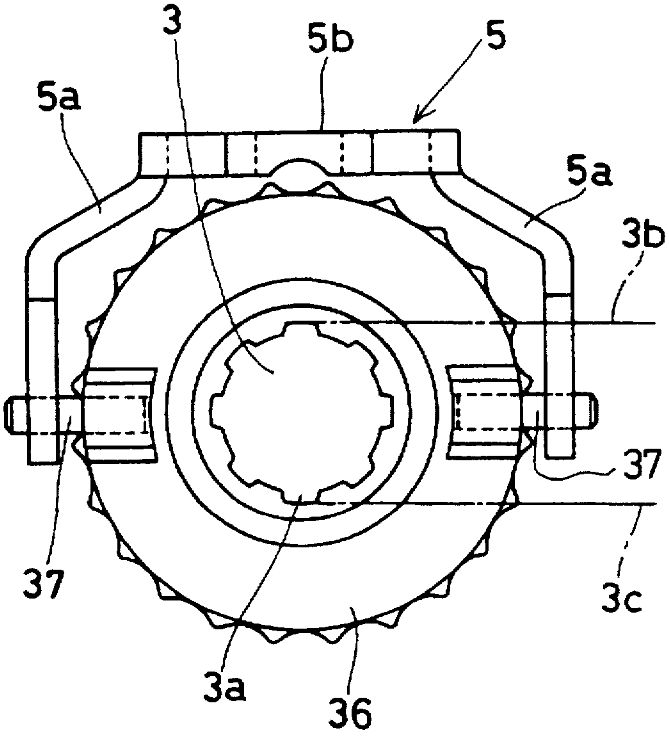
FIG. 8 is a view showing the advanced state of a pinion, as viewed from the side of a starter motor, in the first embodiment.

As shown in FIG. 5, the retreat restricting member 5 comprises two side pieces 5*a* which are generally L-shaped in side view, and a release bar 5*b* which provides a connection between the two side pieces 5*a*. As shown in FIGS. 3 and 7, the retreat restricting member 5 is rotatably engaged around a pair of pins 37 (a first abutting portion in the present invention) as an axis center (see FIG. 4). The pins 37 are biased to the side of a plate 39 attached to the front end of the center case 22 by a spring 38 engaged with one of side pieces 5*a* so that one end (bent portion 5*c*) of each side piece 5*a* abuts the plate 39 and the other end is fixed to the both radial sides of the thrust ring 36. It is to be noted that FIG. 3 shows a rest state (initial position) of the retreat restricting member 5, and FIG. 7 shows a condition where the retreat restricting member 5 moved to the retreat restricting position of the pinion 4. FIG. 8 shows the state, viewed from the side of the starter motor 2 as in FIG. 7, where the retreat restricting member 5 is restricting the retreat of the pinion 4. The pins 37 are provided between a first and second parallel lines 3*b* and 3*c* which are tangential to an outer circumference of the helical spline 3*a* of the output shaft 3 and at positions opposing to each other relative to the output shaft 3 as a center.

Each side piece 5*a* is provided with an engaging recess 5*d* (third abutting portion in the present invention, see FIG. 5) in a position between the bent portion 5*c* and the release bar 5*b*, the recess 5*d* being engageable with an engaging portion 6*a* (described later) of the rotation restricting member 6.

One end of the spring 38 is engaged with the plate 39 (stationary member in the present invention), while the opposite end thereof is engaged with the bent concave portion of one side piece 5a. The spring 38 may be disposed on both sides of the retreat restricting member 5. In other words, there may be used an additional spring 38 for engagement with the other side piece 5a. The retreat restricting member 5 constitutes an arm member in the present invention. Further, the movable cylindrical member of the present invention is comprised of the pinion 4 and the thrust ring 36 assembled to the pinion 4 and the pins 37 provided on the thrust ring 36.

(Rotation Restricting Member 6)

Figure 6:
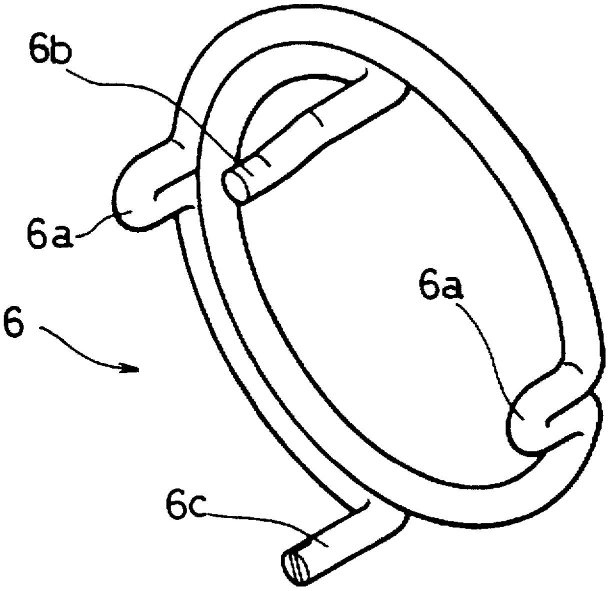
FIG. 6 is a perspective view of a rotation restricting member in the first embodiment.

The rotation restricting member 6 is, as shown in FIG. 6, constituted by winding a metallic bar so that two such engaging portions 6a as referred to above are formed during the winding and so that both end portions of the winding are bent up at right angles in the same direction at radially opposed positions. One end portion of the bar thus bent up serves as a rotation restricting bar 6b which comes into engagement with the recess 34a of the rotation restricting plate 34 at the initial stage of operation of the starter 1 to restrict the rotation of the pinion 4. At the other end portion of the bar is formed a cord-like member engaging portion 6c with which is engaged one end of a cord-like member 40 (connecting member in the present invention; see FIG. 1) such as wire or the like and to which is transmitted the operation of the magnet switch 7 through the cord-like member 40.

As shown in FIG. 1, the rotation restricting member 6 is accommodated in a space formed between the center case 22 and the plate 39 so that its both end portions and two engaging portions 6a are positioned forward with respect to the plate 39 so that it can move vertically (upward and downward directions in FIG. 1) through the space. The rotation restricting member 6 is normally urged upward (upward in FIG. 1) by means of a return spring 41, and when the attractive force of the magnet switch 7 is transmitted to the cord-like member engaging portion 6c through the cord-like member 40, the whole of the rotation restricting member 6 moves downward against the biasing force of the return spring 41, while when the magnet switch 7 is turned off and the attracting force disappears, the whole of the rotation restricting member 6 moves upward and returns to its initial position (the position shown in FIG. 1) by virtue of the return spring 41. The rotation restricting member 6 also constitutes an arm position holding member in the present invention).

(Magnet Switch 7)

As shown in FIG. 1, the magnet switch 7 is disposed inside the end cover 13 while being held on the rear end side of the holder 11 and is fixed so that its operating direction intersects the shaft 14 of the starter motor 2.

The magnet switch 7 comprises switch cover 42, coil 43, stationary core 44, plunger 45, spring 46, and rod 47. The switch cover 42 is formed by pressing a magnetic material (e.g. iron) into a cup shape, and centrally of the bottom of the cover is formed with an insertion hole for slidable insertion therein of the plunger 45.

The coil 43 is connected to a vehicular battery (not shown) through a vehicular starting switch (ignition switch; not shown). When energized upon turning on of the starting switch, the coil 43 generates an electromagnetic force. The stationary core 44 is disposed on the upper end side of the coil 43 and is fixed by caulking to an opening portion of the switch cover 42.

The plunger 45, formed of a magnetic material (e.g., iron) and having a generally cylindrical shape, is disposed in the hollow interior of the coil 43 in opposition to the stationary core 44, and when the coil 43 is energized, the plunger 45 is magnetized and attracted toward the stationary core 44 (upward in FIG. 2). To the bottom of the plunger 45 is connected the other end of the cord-like member 40.

The spring 46 is interposed between the plunger 45 and the stationary core 44 on the inner peripheral side of the coil 43 and urges the plunger 45 downward (downward in FIG. 1) with respect to the stationary core 44. That is, when the coil 43 is deenergized, the plunger 45 which has been attracted to the stationary core side against the biasing force of the spring 46 is returned to its initial position (the position shown in FIG. 1).

The rod 47, which is made of an insulating material (e.g. resin), is fixed to the upper side of the plunger 45, passes through the hollow interior of the coil 43, further passes slidably through a through hole formed centrally in the stationary core 44, and is projected upward.

(Contact Structure of the Starter Motor 2)

A contact structure of the starter motor comprises a terminal bolt 48 attached to the end cover 13, a fixed contact 49 fixed to a head 48a of the terminal bolt 48, a main movable contact 50 connected to a lead wire (not shown) of a positive pole-side brush, and a secondary movable contact 52 connected to the main movable contact 50 through a starting resistor 51.

The terminal bolt 48 is mounted in such a manner that it extends through a bottom wall 13a of the end cover 13 and its front-end side is exposed to the exterior of the end cover 42. The terminal bolt 48 is fixed to the end cover 13 by tightening a washer 53 and is connected to a positive electrode of the vehicular battery through a battery cable (not shown).

Inside the end cover 13 the fixed contact 49 is fixed to the head 48a of the terminal bolt 48 by welding or the like.

The main movable contact 50 is disposed in opposition to the fixed contact 49 and is slidably fitted on the rod 47 of the magnet switch 7.

The starting resistor 51 is formed of nickel for example and is wound in the form of coil to impart resilience thereto. One end of the starting resistor 51 is fixed to the main movable contact 50 and the other end fixed to the secondary movable contact 52.

The secondary movable contact 52 is disposed in opposition to the head 48a of the terminal bolt 48. When the magnet switch 7 is turned on to attract the plunger 45, the secondary movable contact 52 abuts the bolt head 48a with movement of the rod 47, while when the magnet switch 7 is turned off, the contact 52 abuts the outer end face of the stationary core 44 and turns conductive electrically (see FIG. 2).

The spacing between the secondary movable contact 52 and the head 48a of the terminal bolt 48 is set smaller than the spacing between the main movable contact 50 and the fixed contact 49. When the magnet switch 7 is turned on and the plunger 45 attracted toward the stationary core 44, the secondary movable contact 52 comes into abutment with the head 48a of the terminal bolt 48 before abutment of the main movable contact 50 with the fixed contact 49, whereby the battery voltage is applied to the armature 10 of the starter motor 2 through the starting resistor 51.

(Operation of First Embodiment)

The operation of this embodiment will be described below.

When the starting switch is turned on by a driver, the coil 43 of the magnet switch 7 is energized and the plunger 45 is attracted toward the magnetized stationary core 44 against the biasing force of the spring 46.

With such movement of the plunger 45, the cord-like member 40 is pulled toward the magnet switch 7, so that the rotation restricting member 6 moves downward through the space portion, and the rotation restricting bar **6*b* comes into engagement with a recess 34*a* formed on the outer periphery of the rotation restricting plate 34 to restrict the rotation of the pinion 4**.

On the other hand, as the plunger 45 goes up, the secondary movable contact 52 abuts the head **48*a* of the terminal bolt 48 and the positive pole-side brush is supplied with the electric power through the starting resistor 51, whereby a low voltage is applied to the starter motor 2 to start up the same motor, and the armature 10 starts rotating. The rotation of the armature 10 is decelerated by the planetary gear reduction mechanism and then transmitted to the output shaft 3, causing the output shaft 3 to rotate. With this rotation of the output shaft 3, the pinion 4 also tries to rotate, but since the rotation of the pinion 4 is restricted by the rotation restricting bar 6*b*, the rotating force of the output shaft 3 works on the pinion 4 as an axially pushing-out thrust. As a result, the pinion 4 advances along the helical spline with respect to the output shaft 3, thus permitting the pinion gear 4*a* to come into mesh with the ring gear 100**.

On the other hand, with the advance motion of the pinion 4, the retreat restricting member 5 is pulled by the thrust ring 36, so that the bent portions **5*c* of the retreat restricting member 5 get into the inside while sliding on the plate 39, and as shown in FIG. 7 the whole of the retreat restricting member 5 is raised up axially and is interposed between the thrust ring 36 and the plate 39. In order that the retreat restricting member 5 can return to its initial position when the magnet switch 7 is turned off, the bent portions 5*c* (abutments onto the plate 39) of the retreat restricting member 5 are positioned outside an axis A passing through the pin 37 (above the axis A in FIG. 2**).

Upon complete meshing of the pinion gear **4*a* with the ring gear 100, the front end of the rotation restricting bar 6*b* of the rotation restricting member 6 becomes disengaged from the recess 34*a* of the rotation restricting plate 34 and falls toward the rear end side of the thrust ring 36, thereby releasing the rotation-restricted state of the pinion 4**.

Further, after the engaging portions **6*a* of the rotation restricting member 6 are raised up axially, they come into engagement with the engaging recesses 5*d* of the retreat restricting member 5, whereby the posture of the retreat restricting member 5 is kept as it is. Thus, the rotation restricting member 6 also serves as a posture holding means for holding the posture of the retreat restricting member 5**.

Thereafter, upon abutment of the main movable contact 50 with the fixed contact 49, the starting resistor 51 is short-circuited and a rated voltage of the battery is applied to the starter motor 2, thus causing high speed rotation of the armature 10. The rotation of the armature 10 is transmitted to the output shaft 3 through the planetary gear reduction mechanism and the pinion 4 which has been released from the rotation-restricted state rotates together with the output shaft 3, causing the ring gear to rotate, whereby the engine can be started up.

With the pinion 4 advanced and the pinion gear **4*a* meshing with the ring gear 100, the biasing force of the spring 32 disposed on the front-end side of the pinion 4 becomes large. When the pinion 4 is rotated by the ring gear 100 after start-up of the engine, the rotating force of the engine works on the pinion retreating direction under the action of the helical spline 3*a*. With these forces, the pinion 4 tries to retreat with respect to the output shaft 4, but the retreat restricting member 5 and the rotation restricting member 6 can inhibit the retreat of the pinion conjointly (that is, the rotation restricting member 6 holds the posture of the retreat restricting member 5 located in its retreat restricting position). Since the pair of side pieces 5*a* of the retreat restricting member 5 are in abutment with the pins 37 fixed to the both sides of the thrust ring 36, retreating of the pinion 4** is restricted.

Thereafter, when the starting switch is turned off to stop the supply of electricity to the coil 43 of the magnet switch 7, the coil 43 is deenergized, so that the plunger 45 which has been attracted toward the stationary core 44 is returned to its initial position (moves downward in FIG. 1) with the biasing force of the spring 46. As a result, the pulling force for the rotation restricting member 6 through the cord-like member 40 disappears and hence the rotation restricting member 6 reverts to its initial position by virtue of the return spring 41.

At this time, the engaging portions **6*a* of the rotation restricting member 6 are disengaged from the engaging recesses 5*d* of the retreat restricting member 5 and the release bar 5*b* is pushed upward by the rotation restricting bar 6*b* of the rotation restricting member 6, so that the retreat restricting member 5 rotates counterclockwise in FIG. 7 about the pin 37 fixed to the thrust ring 36 and is released from the retreat restricting position for the pinion 4. As a result, the pinion 4 which undergoes a retreating force from the ring gear 100 is returned to its rest state (the state shown in FIGS. 1 and 3**).

(Advantages of First Embodiment)

According to the embodiment, the paired side pieces **5*a* of the retreat restricting member 5 are positioned between the first and second parallel lines 3*b* and 3*c* tangential to the outer circumference of the helical spline of the output shaft 3 and at positions opposing to each other relative to the output shaft 3 as the center. Further, the side pieces 5*a* respectively abuts the pins 37 fixed to both radial sides of the thrust spring 36 assembled to the pinion 4**.

Compared with the conventional support structure at one point, the moments exerting on the respective side pieces **5*a* which tends to incline the pinion 4 exert oppositely to cancel out component forces. In particular, since the side pieces 5*a* are positioned between the first and second parallel lines 3*b* and 3*c* which are respectively tangential to the outer circumference of the helical spline 3*a* of the output shaft 3, the moments which exerts on the side pieces 5*a* can be reduced greatly than in the case where the side pieces 5*a* are outside the first and second tangential lines 3*b* and 3*c*. Consequently, it is possible to prevent the pinion 4 from tilting relative to the output shaft 3, thereby preventing deformation of the retreat restricting member 5 and local wear or the generation of noise between the pinion 4 and the side pieces 5*a* of the retreat restricting member 5 which are caused by tilting of the pinion 4**.

Moreover, since the retreat restricting member 5 comes to assume the position between the thrust ring 36 and the plate 39 with advance motion of the pinion 4 and the posture of the retreat restricting member 5 is kept as it is by the rotation restricting member 6, it is possible to inhibit the retreat of the pinion 4. Therefore, the magnet switch 7 for driving the rotation restricting member 6 through the cord-like member 40 is required to generate only an attractive force enough to move the rotation restricting member 6 to its engaging position for holding the posture of the retreat restricting member 5. That is, the magnet switch 7 does not require a force (plunger attracting force) enough to overcome the retreating force applied from the ring gear 100 to the pinion 4, and it suffices to ensure the stroke of the plunger 45 by only the distance of movement of the rotation restricting member 6 from the outer peripheral side of the pinion 4 up to the space position at the rear end. Thus, it becomes possible to attain the reduction in size of the magnet switch 7.

Further, in particular, since the paired side pieces 5a of the retreat restricting member 5 respectively abut the pair of pins 37 which are fixed to the both radial sides of the thrust ring 36 assembled to the pinion 4 at two locations radially symmetric relative to the axis center of the pinion 4, it is highly possible to prevent the movable cylindrical member (thrust ring 36 and the pins 37 on the thrust ring 36) from tilting relative to the output shaft 3.

Further, since the retreat restricting member 5 supports at its side pieces 5a the thrust ring 36 mounted to the pinion 4, the thrust ring 36 performs a relative rotation with respect to the pinion 4 even upon rotation of the pinion 4, whereby the rotating force of the pinion 4 can be prevented from being transmitted to the side pieces 5a of the retreat restricting member 5. Consequently, it is possible to prevent follow-up rotation of the side pieces 5a with rotation of the pinion 4.

Moreover, since the operating posture of the retreat restricting member 5 which maintains the advanced state of the pinion 4 and restricts the retreat of the same pinion is retained by the rotation restricting member 6 which constitutes posture holding means, there is no retreat-restricted state of the pinion 4 being released by the retreat restricting member 5 due to vibrations imposed on the starter 1 or the like. Thus, the retreat restricting member 5 can maintain the advanced state of the pinion 4 stably.

Further, since restricting the rotation of the pinion 4 and holding the posture of the retreat restricting member 5 can be constituted by the same material, there is neither addition of component parts nor complication.

With the retreat restricting member 5 being raised in the axial direction along with the advance movement of the pinion 4, the bent portion 5c abutting the plate 39 moves to slide over the plate 39 and enter into the axial direction side of the output shaft 3. Accordingly, while the pinion 4 is at rest, the bent portion 5c of the retreat restricting member 5 is located on the plate 39 and at the radial direction side of the output shaft 3. That is, the retreat restricting member 5 is raised in the axial direction to be placed between the pinion 4 and the center case 22, only when the pinion 4 advances. As a result, the entire starter length (axial length) at the rest condition of the pinion 4 can be set short.

Moreover, since the rotation restricting member 6 is connected through the cord-like member 40 to the magnet switch 7 and is moved to the position of abutment with the pinion 4, the freedom of disposition of the magnet switch 7 relative to the starter motor 2 increases (the magnet switch 7 may be disposed in any position relative to the starter motor 2) and the mountability on the engine is improved.

Further, since the spring 38 is hooked to both retreat restricting member 5 and plate 39, the pinion 4 is pulled backward (rightward in FIG. 1) through the retreat restricting member 5. Therefore, the spring 38 can be used also as a return spring for the pinion 4 and so it is possible to omit the spring 32 disposed in front of the pinion 4.

Moreover, by a mere return of the rotation restricting member 6 to its initial position under the biasing force of the return spring 41 after turning-off of the magnet switch 7, the engaging portions 6a of the rotation restricting member 6 and the engaging recesses 5d of the retreat restricting member 5 are disengaged from each other automatically, and the rotation restricting bar 6b pushes up the release bar 5b, so that the retreat restricting member 5 pivotally moves about the pins 37 in a simple manner and can be disengaged from the retreat restricting position for the pinion 4. Consequently, the load on the return spring 41 (the releasing force for the rotation restricting member 6) can be set low, and thus it is possible to set small the attractive force of the magnet switch 7 and attain the reduction in size.

Additionally, since in the first embodiment the retreat restricting member 5 is mounted through the thrust ring 36 to the pinion 4 slidingly in the radial direction and is engaged rotatably with the pins 37 which are fixed to both sides in the radial direction of the thrust ring 36, it is possible to prevent follow-up rotation of the retreat restricting member 5 with the pinion 4, and there is no possibility of a deflected load being applied to the pinion 4. Consequently, it is possible to prevent a local wear of the pinion 4 and the rotation restricting member 6 and also prevent the generation of noise induced by such local wear.

(Second Embodiment)

Figure 9:
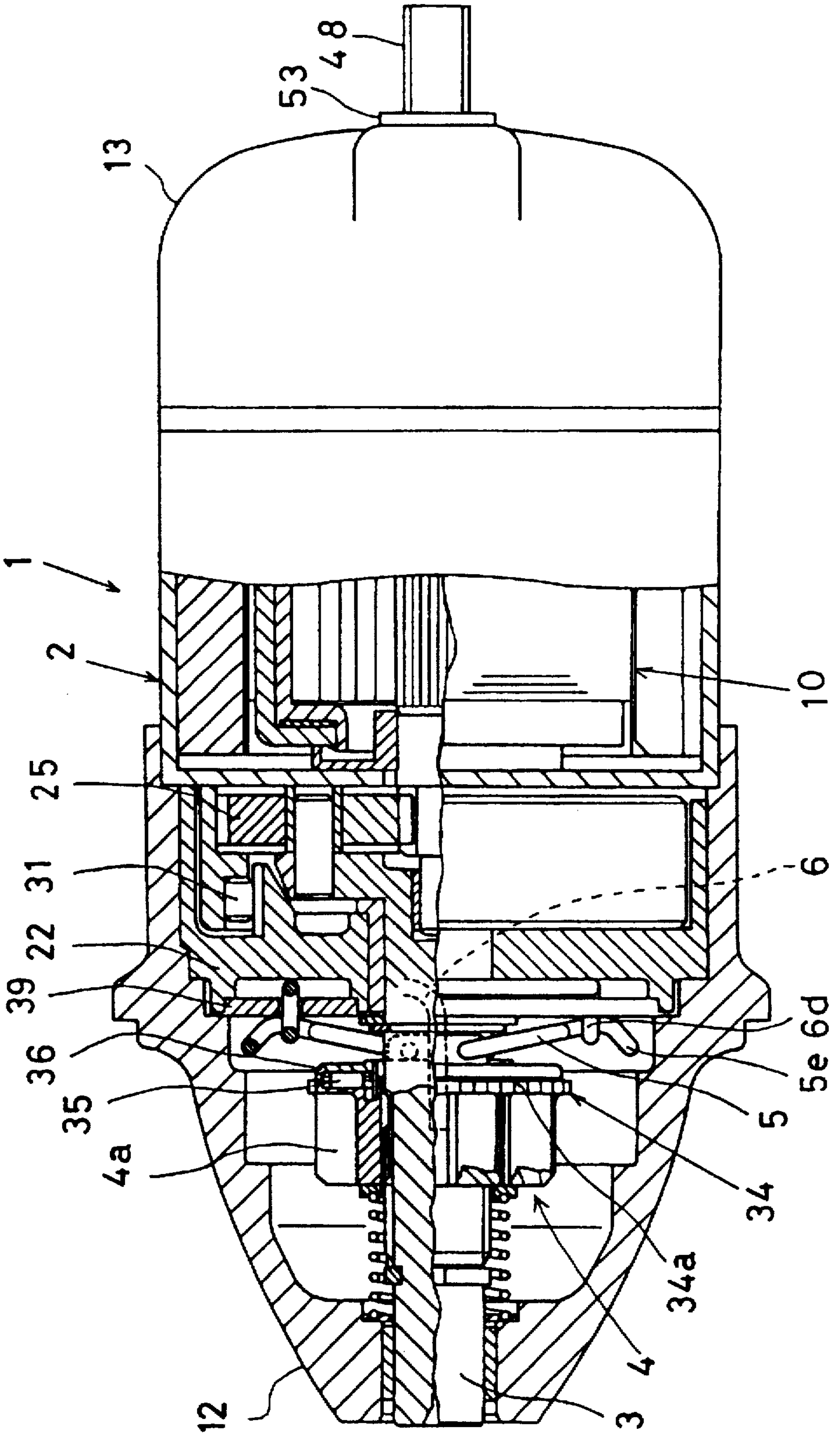
FIG. 9 is a sectional view of the main part of a starter according to a second embodiment of the invention.
Figure 10:
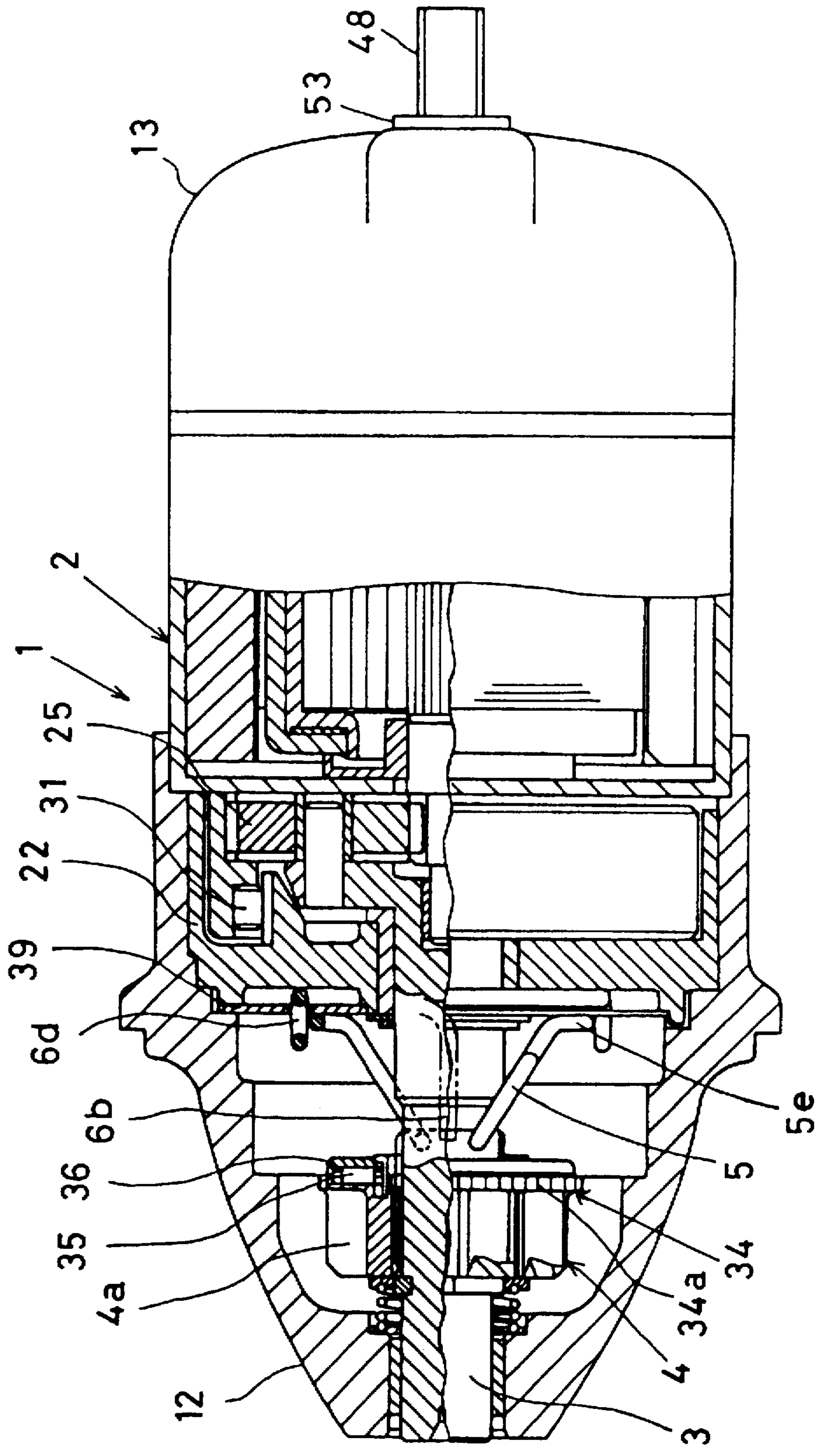
FIG. 10 is a sectional view of the main part of the starter according to the second embodiment.

FIGS. 9 and 10 are sectional views of a principal portion of a starter according to a second embodiment of the invention.

The starter of this embodiment, indicated at 1, is different in the structure of the pinion retreat restricting mechanism from that in the first embodiment, which difference will be described below. The components having the same functions, (or the same names), as in the first embodiment are indicated by the same reference numerals as in the first embodiment and explanations thereof will be omitted for brevity.

Figure 12:
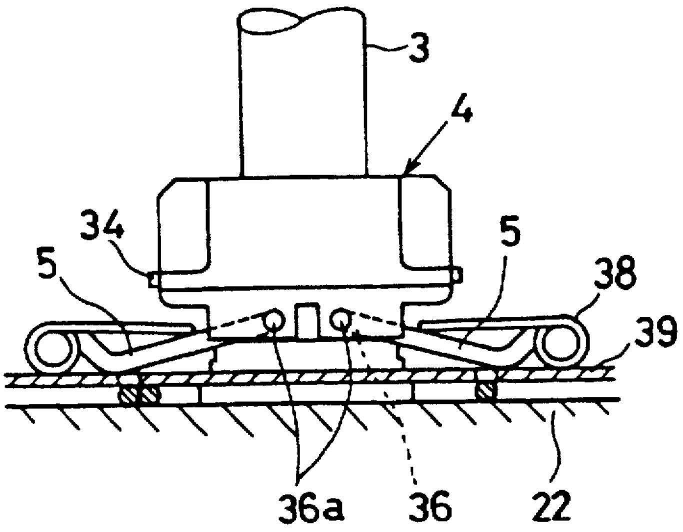
FIG. 12 is a side view corresponding to the operating state of FIG. 11 in the second embodiment.
Figure 13:
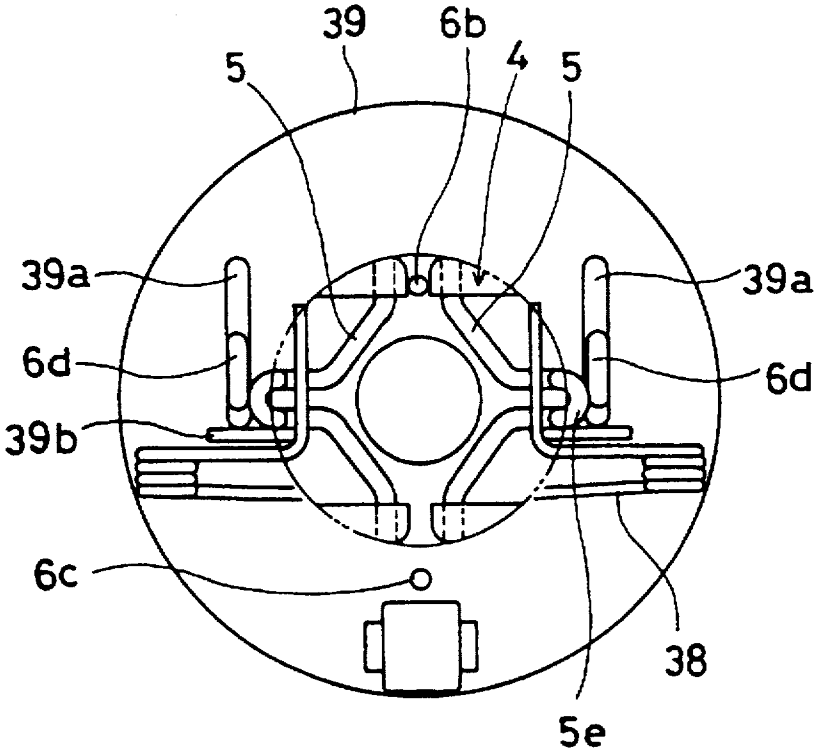
FIG. 13 is an explanatory view showing an operating state of the retreat restricting member and that of the rotation restricting member in the second embodiment.

A retreat restricting member 5 has a generally V-bent shape of a rod-like member, as shown in FIG. 13, and is disposed on both sides in the radial direction with respect to an output shaft 3, with the end portion (first abutting portion in the present invention) thereof being turnably fitted in holes 36a (see FIG. 14) formed on side face of a thrust ring 36. By means of springs 38 the retreat restricting members 5 are urged toward a plate 39 disposed at the front end of a center case 22 and are pushed out to both radially outer sides with respect to the plate 39 (see FIG. 12). That is, when the magnet switch 7 is kept turned off, the pinion 4 is maintained in a rest state through the retreat restricting members 5 thus urged by the springs 38 so as to prevent the pinion 4 from rushing out due to vibrations of the engine or the like.

Figure 16:
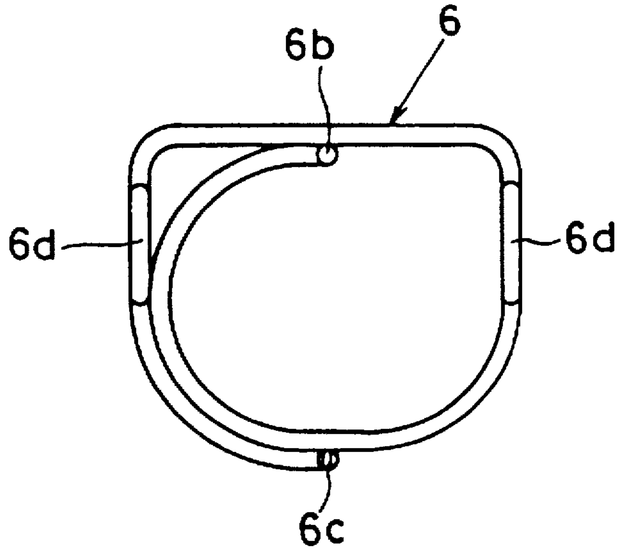
FIG. 16 is a front view of the rotation restricting member in the second embodiment.
Figure 17:
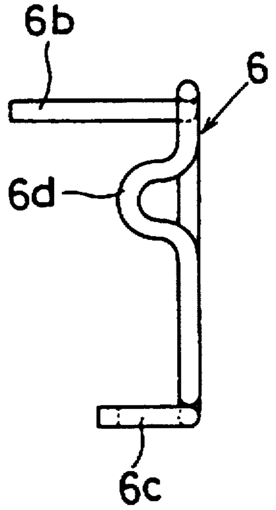
FIG. 17 is a side view of the rotation restricting member in the second embodiment.

As shown in FIGS. 16 and 17, a rotation restricting member 6 is formed by winding a metallic wire or the like so that two projecting portions 6d are formed in intermediate positions and so that both end portions 6b and 6c are bent and raised up at right angles in radially opposed positions and in the same direction. One end portion 6b thus raised up comes into engagement with a recess 34a of the rotation restricting plate 34 at the initial stage of operation of the starter 1 and thus serves as a rotation restricting bar 6b for restricting the rotation of the pinion 4, while a cord-like member engaging portion 6c is formed at the other raised-up end portion and one end of a cord-like member 40 is engaged therewith. The operation of the magnet switch 7 is transmitted to the rotation restricting member 6 through the cord-like member 40.

Figure 14:
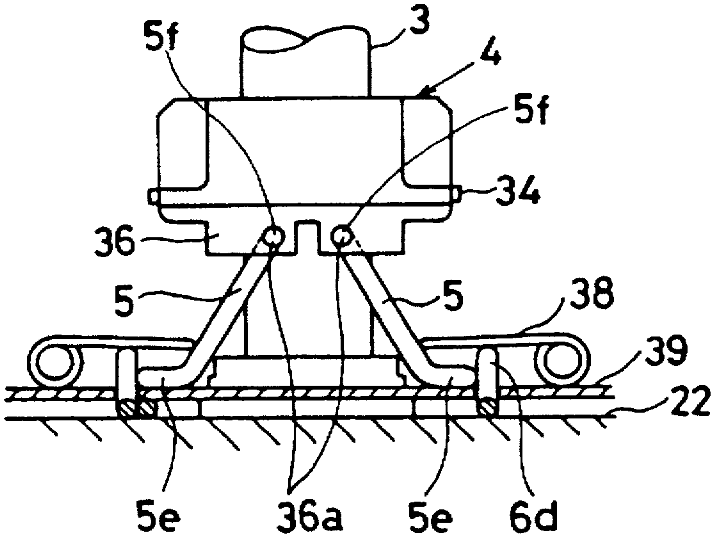
FIG. 14 is a side view corresponding to the operating state of FIG. 12 in the second embodiment.

When the pinion 4 advances and the retreat restricting members 5 are pulled up axially, the two projecting portions 6d come into engagement with leg portions 5e of the retreat restricting members 5 and thereby serve as stoppers to prevent the retreat restricting member 5 from falling down (see FIGS. 13 and 14).

Figure 11:
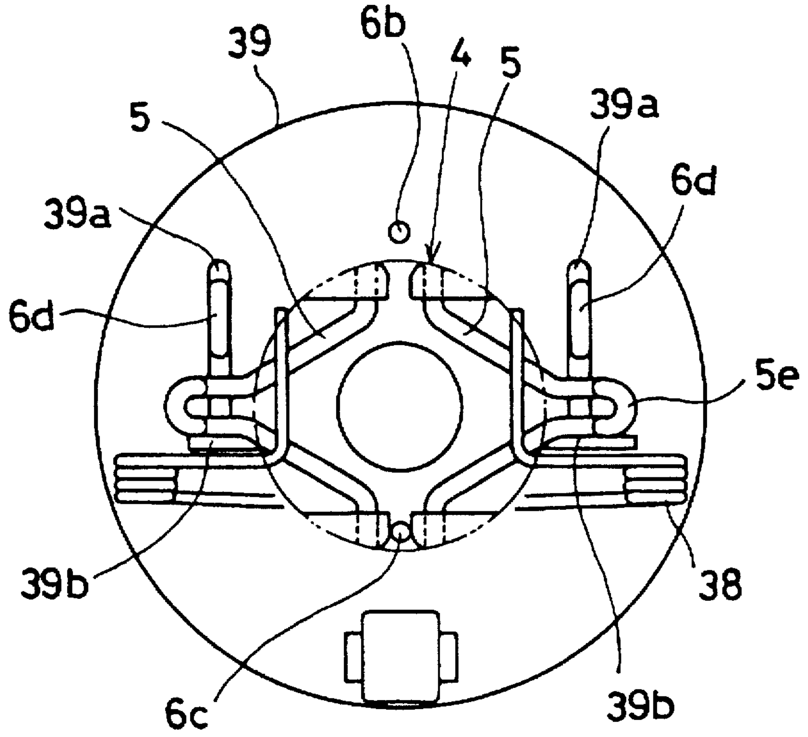
FIG. 11 is an explanatory view showing an operating state of a retreat restricting member and that of a rotation restricting member in the second embodiment.
Figure 15:
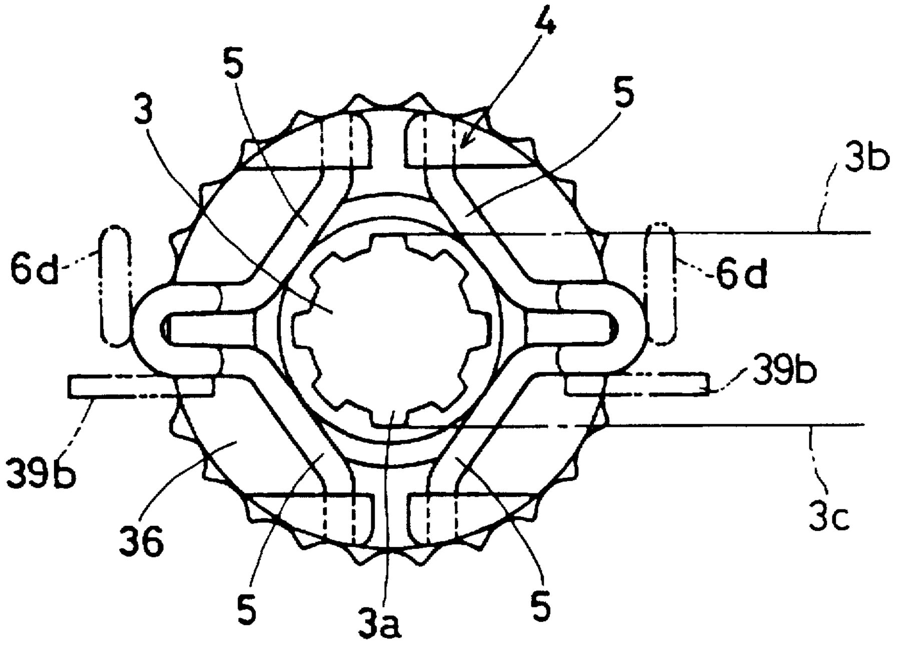
FIG. 15 is a view showing the advanced state of a pinion, as viewed from the side of a starter motor, in the second embodiment.

In the plate 39 are formed sliding slots 39a for sliding of the projecting portions 6d of the rotation restricting member 6 and are also provided pivotal movement stop portions 39b for the retreat restricting member 5 (see FIGS. 11 and 13). The pivotal movement stop portions 39b are for preventing follow-up rotation of the thrust ring 36 caused by a frictional transfer of the pinion rotation to the thrust ring 36. It is to be understood that FIG. 15 shows the retreat restricted condition of the pinion 4 by the retreat restricting member 5 as viewed from the side of the starter motor 2 as in FIG. 13. The retreat restricting member 5 is disposed (4 locations) between the first and second parallel lines 3b and 3c tangential to the outer circumference of the helical spline 3a of the output shaft 3 and at both radial sides of the output shaft 3. The pinion 4 has the axis center within a rectangle defined by the four locations. That is, the axis center of the pinion 4 is located within a polygonal shape which is formed by connecting the first abutting portions 5f abutting at three or more locations the thrust ring 36 assembled to the pinion 4.

(Operation of Second Embodiment)

The operation of this embodiment will be described below.

Like the first embodiment, when a starting switch is turned on to operate a magnet switch 7, the rotation restricting bar 6b of the rotation restricting member 6 comes into engagement with a recess 34a of the rotation restricting plate 34 to restrict the rotation of the pinion 4.

On the other hand, the output shaft 3 rotates under the rotating force of the starter motor 2, whereby the rotation-restricted pinion 4 advances along the helical spline 3a on the output shaft 3 and the pinion gear 4a come into mesh with a ring gear, thus causing the engine to start up.

At this time, as shown in FIG. 14, the retreat restricting member 5 is pulled by the thrust ring 36 with advance motion of the pinion 4 and is thereby interposed between the thrust ring 36 and the plate 39.

On the other hand, upon complete meshing of the pinion gear 4a with the ring gear, the front end of the rotation restricting bar 6b becomes disengaged from the recess 34a of the rotation restricting plate 34 and falls into the rear end side of the thrust ring 36, thereby releasing the rotation restriction for the pinion 4. At the same time, the projecting portions 6d of the rotation restricting member 6 move along the sliding slots 39a and come into engagement with the leg portions 5e (pivotal movement support portion in the present invention) of the retreat restricting members 5, thus serving as stoppers to prevent the retreat restricting member 5 from falling down, whereby the posture of the retreat restricting member 5 is kept as it is.

In this state, even when the pinion 4 is rotated by the ring gear and a retreating force is exerted on the pinion, it is possible to prevent retreat of the pinion 4 because by posture of the retreat restricting members 5 interposed between the thrust ring 36 and the plate 39 is retained by the rotation restricting member 6.

Thereafter, when the starting switch is turned off, the rotation restricting member 6 returns to its initial position under the biasing force of a return spring 38, whereby the projecting portions 6d of the rotation restricting member 6 and the leg portions 5e of the retreat restricting members 5 are disengaged from each other. As a result, the pinion 4 is returned to its rest state (the state shown in FIGS. 9 and 12) together with the retreat restricting member 5.

(Advantages of Second Embodiment)

According to this embodiment, the same effects as in the first embodiment can be attained. Particularly in this embodiment, the end portion 5f engaged in the hole 36a of the thrust ring 36 mounted on the pinion 4 abuts the thrust ring 36 at three or more locations around the axis center of the pinion 4. Therefore, The pinion 4 is prevented from tilting relative to the output shaft 3. Further, the following effects can also be provided.

In the first embodiment the operating directions of the retreat restricting member 5 and that of the rotation restricting member 6 are the same with respect to the direction in which the retreating force of the pinion 4 is applied, so a certain type of an engine may require increasing the attractive force of the magnet switch 7 in proportion to the retreating force of the pinion 4.

According to this embodiment, in contrast thereto, since the operating directions of the retreat restricting members 5 and that of the rotation restricting member 6 (the operating direction of the projecting portions 6d) are orthogonal to each other with respect to the direction in which the retreating force of the pinion 4 is applied, it is not necessary to increase the attracting force of the magnet switch in proportion to the retreating force of the pinion 4. This is suitable for the reduction in size of the magnet switch.

Moreover, the retreat restricting members 5 are supported by the rotation restricting member 6 at the end portion which on the counter-fulcrum side (i.e., opposite side to one end portion with respect to the point of action) opposite to the point of action on which the retreating force of the pinion 4 exerts. That is, the retreat restricting members 5 are supported at both ends by the center case 22 and the rotation restricting member 6 relative to the retreating force of the pinion 4 exerting on the point of action. As a result, since the retreat restricting members 5 can deform (flex) against the retreating force of the pinion 4, the members themself flex to provide a buffer effect when the pinion 4 vibrates in the axial direction (back-and-forth movement at the time of engine starting) and applies repeated retreating forces to the retreat restricting members 5.

(Third Embodiment)

Figure 18:
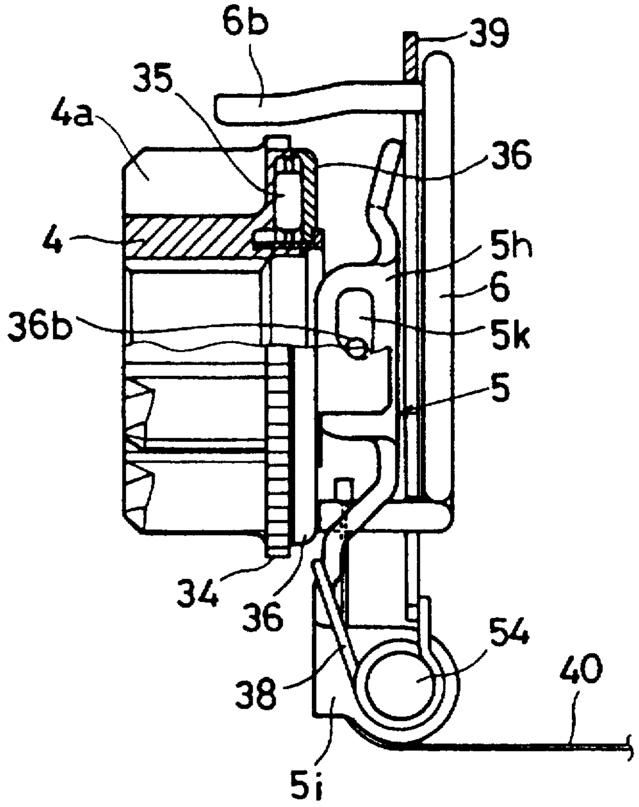
FIG. 18 is a side view showing an operating state of a retreat restricting member and that of a rotation restricting member according to a third embodiment of the invention.

FIG. 18 is a side view of a pinion retreat restricting mechanism according to a third embodiment of the invention.

A starter according to this embodiment is different in the structure of the pinion retreat restricting mechanism from the second embodiment, which difference will be described below. The same components having the same functions (the same names), as in the first and second embodiments are indicated by the same reference numerals and explanations thereof will be omitted for brevity.

Figure 19:
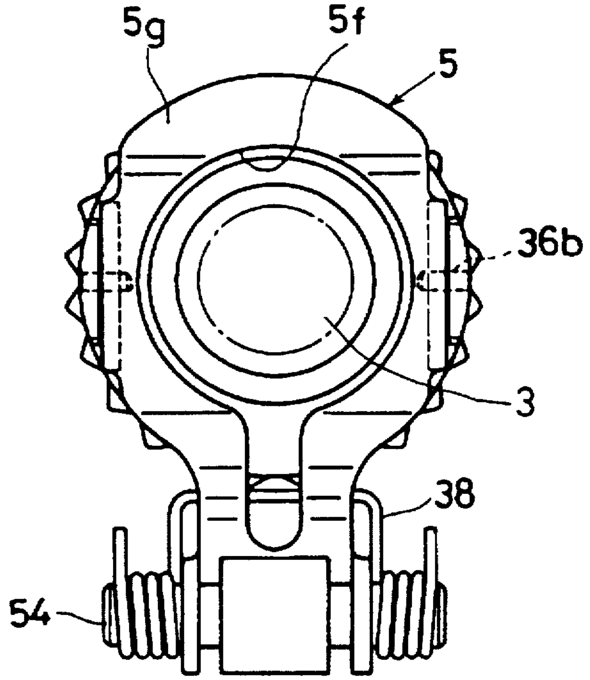
FIG. 19 is a front view showing a mounted state of the retreat restricting member in the third embodiment.
Figure 20A:
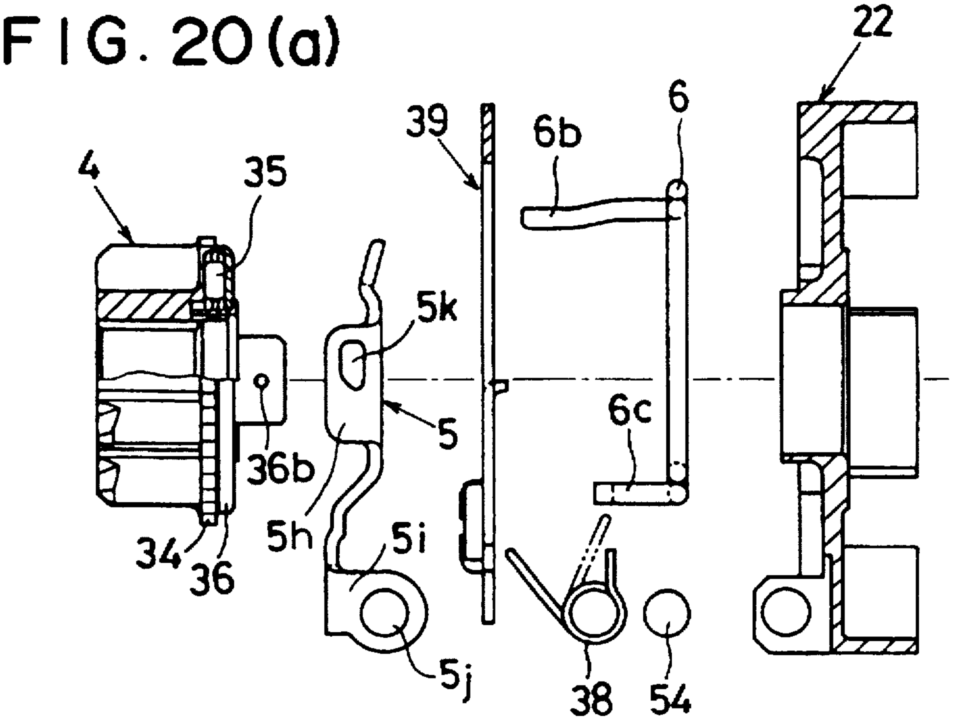
FIGS. 20 (*a*) and 20(*b*) are respectively an exploded view of a pin retreat restricting mechanism and a side view of a pinion and a retreat restricting member of the pinion retreat retreat restricting mechanism in the third embodiment.
Figure 20B:
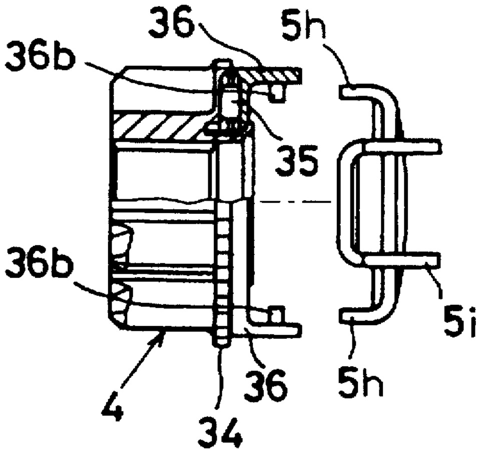

A retreat restricting member 5 includes an annular portion 5q (see FIG. 19) having a central circular hole 5f for passing therethrough an output shaft 3, side wall portions 5r bent at right angles to the annular portion 5q on both sides of the annular portion 5q, and fulcrum portions 5i each supported rotatably by a support pin 54 which is fixed to a center case 22. The retreat restricting member 5 is mounted by fitting the support pin 54 into a hole 5j (see FIG. 20) formed in each fulcrum portion 5i and by fitting engaging pins 36b of thrust ring 36 into elongated holes 5k formed in the side wall portions 5r. Thus, the retreat restricting member 5 is pivotable about the support pin 54.

The retreat restricting member 5 is urged toward a plate 39 by means of a spring 38 fitted on the support pin 54. More specifically, the spring 38 urges the pinion 4 backward (toward the plate 39 through the retreat restricting member 5 to hold the pinion in a rest state and at the same time gives aid to preventing jump-out of the pinion 4 after start-up of the engine.

Figure 21:
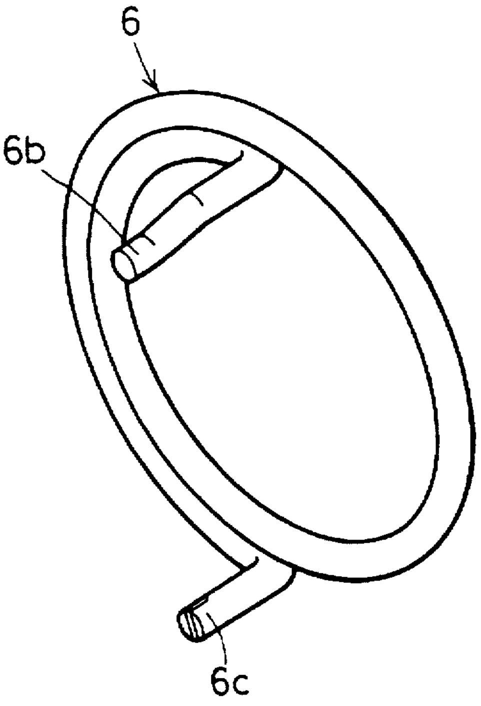
FIG. 21 is a perspective view of the rotation restricting member in the third embodiment.
Figure 22:
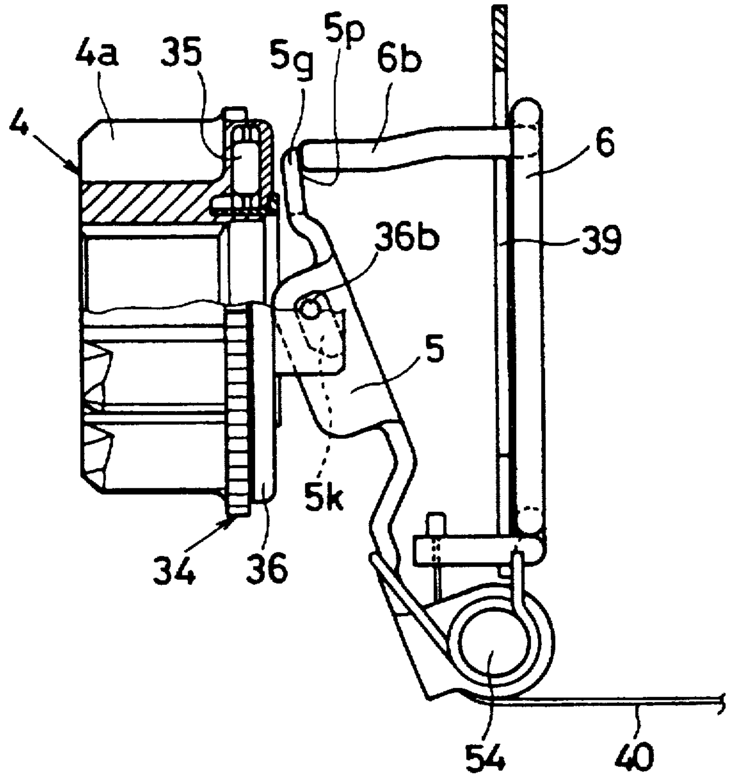
FIG. 22 is a side view showing an operating state of the retreat restricting member and that of the rotation restricting member in the third embodiment.

As shown in FIG. 21, the rotation restricting member 6 is formed by winding a metallic rod or the like in such a manner that both end portions thereof are bent and raised up at right angles in the same direction and in opposed positions radially. One end portion thereof thus raised up comes into engagement with a recess 34*a* of the rotation restricting plate 34 at the initial stage of operation of the starter and thus serves as a rotation restricting bar 6*b* for restricting the rotation of the pinion 4. With the other end portion of the rotation restricting member 6 which portion serves as a cord-like member engaging portion 6*c* there is engaged with one end of a cord-like member 40. The operation of a magnet switch is transmitted to the rotation restricting member 6 through the cord-like member 40. When the retreat restricting member 5 is pulled up axially with advance motion of the pinion 4, as shown in FIG. 22, the rotation restricting bar 6*b* moves into the portion behind the annular portion 5*q* of the retreat restricting member 5 and supports an end 5*p* (second abutting portion in the present invention) of the annular portion 5*q*, thereby holding the posture of the retreat restricting member 5. In this embodiment, as in the first embodiment, when the retreat of the pinion 4 is restricted, the side wall portions 5*r* of the retreat restricting member 5 abut the thrust ring 36 of the pinion at the positions which are between the first and second parallel tangential lines 3*b* and 3*c* tangential to the outer circumference of the helical spline 3*a* of the output shaft 3 and opposing each other with respect to the output shaft 3.

(Operation of Third Embodiment)

The operation of this embodiment will be described below.

Like the first and second embodiments, when a starting switch is turned on to operate the magnet switch, the rotation restricting bar 6*b* of the rotation restricting member 6 comes into engagement with a recess 34*a* of the rotation restricting plate 34 to restrict the rotation of the pinion 4.

On the other hand, as the output shaft 3 rotates under the rotating force of the starter motor 2, the pinion 4 which is in a rotation-restricted state advances along the helical spline on the output shaft 3 and the pinion gear 4*a* comes into mesh with the ring gear to start up the engine.

At this time, as shown in FIG. 22, with advance motion of the pinion 4, the retreat restricting member 5 is pulled up axially about the support pin 54 while the engaging pins 36*b* of the thrust ring 36 and the elongated holes 5*k* formed in the side wall portions 5*r* are engaged with each other.

On the other hand, upon complete meshing of the pinion gear 4*a* with the ring gear, the front end of the rotation restricting bar 6*b* becomes disengaged from the recess 34*a* of the rotation restricting plate 34 and falls behind the rear end of the thrust ring 36, thereby releasing the rotation restriction for the pinion 4, and at the same time the front end of the rotation restricting bar 6*b* supports the end 5*p* of the retreat restricting member 5, whereby the posture of the retreat restricting member 5 which has been pulled and raised up axially by the thrust ring 36 is retained.

As a result, even when the pinion 4 is rotated by the ring gear and a retreating force is exerted on the pinion 4, the retreat of the pinion 4 can be inhibited by co-operation of both retreat restricting member 5 and rotation restricting member 6.

Thereafter, when the starting switch is turned off, the rotation restricting member 6 is returned to its initial position by the biasing force of a return spring (not shown), whereby the front end of the rotation restricting bar 6*b* is disengaged from the rear end of the retreat restricting member 5 and hence the pinion 4 is returned to its rest state (state shown in FIG. 18) together with the retreat restricting member 5.

In this embodiment the retreat restricting member 5 is mounted on the pinion 4 rotatably through thrust ring 36 and the rotating force of the pinion 4 is not applied to the rotation restricting bar 6*b* which supports the end 5*p* of the retreat restricting member 5, so it is less likely that the rotation restricting bar 6*b* will be bent or subject to wear.

Besides, since the side wall portions 5*r* of the retreat restricting member 5 come into abutment with the rear end face of the thrust ring 36 at both sides in the radial direction, the pinion 4 is supported at two points. Therefore, the pinion 4 does not tilt with respect to the output shaft 3, thus ensuring a high reliability of the starter.

(Advantages of Third Embodiment)

According to this embodiment, in addition to the same effects as in the first embodiment mentioned above there are attained the following effects and features.

Owing to the arrangement of the rotation restricting member 6 constituting the posture holding means in the space between the center cace 22 as the stationary member and the retreat restricting member 5, the protruding portion 6*d* works as a stop bar when the pinion 4 tends to retreat, thereby preventing the pinion 4 from retreating.

The end portion of the retreat restricting member 5 on the side opposite to the support portion side with respect to the working points (the engaging points between the side wall portions 5*r* and the thrust ring 36) to which the retreating force of the pinion 4 is applied. That is, the retreat restricting member 5 is supported at two points of both ends against the retreating force of the pinion 4 applied to the working points, thus permitting the retreat restricting member 5 to undergo an axial deformation (deflection) against the retreating force of the pinion 4. As a result, when the pinion gear 4*a* flutters (moves back and forth in the axial direction) at the time of start-up of the engine after meshing of the pinion gear with the ring gear, the force generated upon retreat of the pinion 4 can be absorbed (buffered).

Further, the distance from the fulcrum portion 5*i* of the retreat restricting member 5 to the end of annular portion 5*q* for abutment with the rotation restricting bar 6*b* can be set longer than the distance from the fulcrum portion 5*i* to each working point to which the retreating force of the pinion 4 is applied. Therefore, on the basis of the principle of the lever, the force necessary for preventing the retreat of the pinion 4 can be set lower than that received directly. Consequently, for the rotation restricting bar portion 6*b* it is possible to adopt a material of an appropriate strength accordingly, in other words, an excessively high strength material is not needed, whereby it is made possible to provide the starter in low cost.

(Fourth Embodiment)

Figure 23:
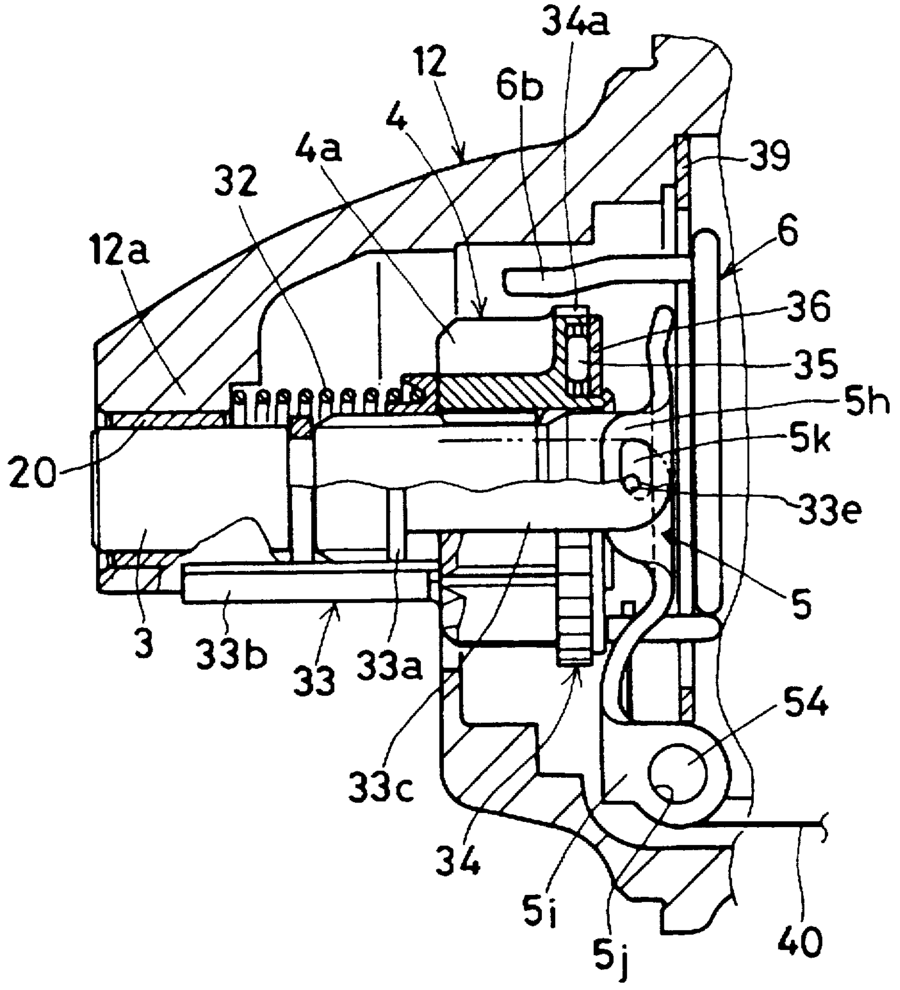
FIG. 23 is a sectional view showing an internal structure of a pinion and the vicinity thereof according to a fourth embodiment of the invention.

FIG. 23 is a sectional view showing an internal structure of a pinion 4 and components disposed thereabouts. A rotation restricting member 6 is constructed in the same manner as in the third embodiment.

This embodiment shows an example of a structure wherein a retreat restricting member 5 is interlocked with a shutter 33.

Figure 24:
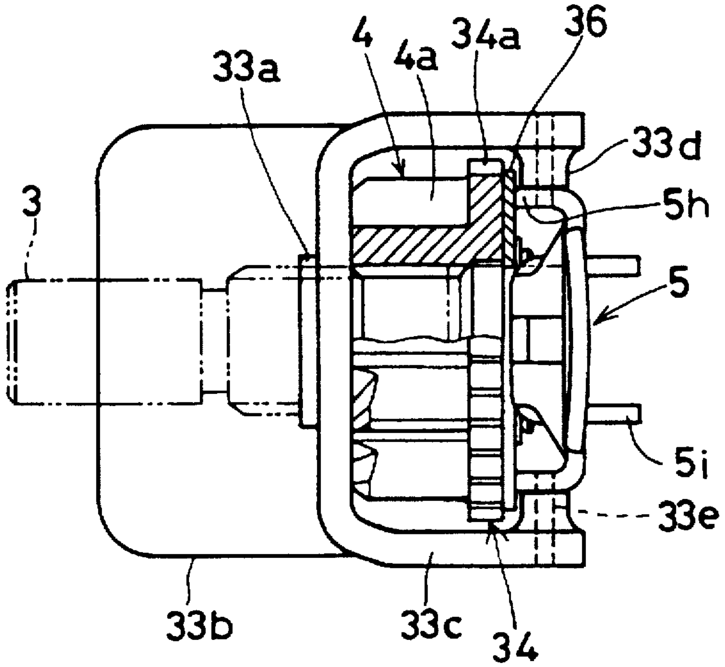
FIG. 24 is a plan view showing a mounted state of a retreat restricting member in the fourth embodiment.
Figure 25:
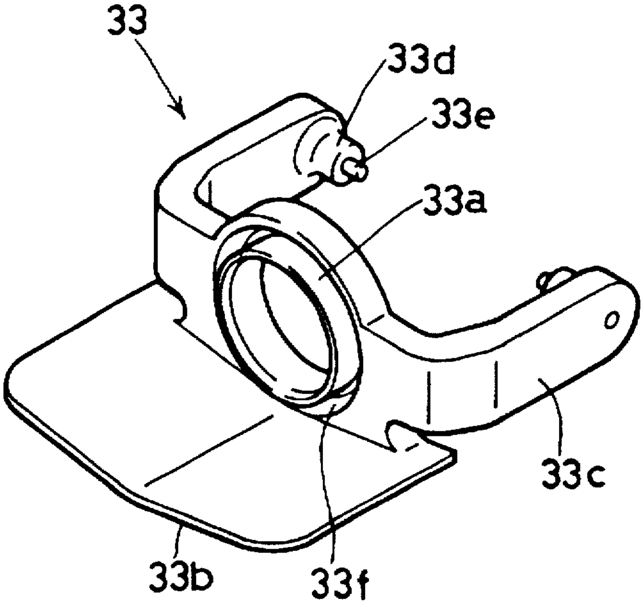
FIG. 25 is a perspective view of a shutter in the fourth embodiment.

The shutter 33 is for opening and closing an opening (not shown) of a housing 12 in interlock with movement of the pinion 4 which opening is formed on the ring gear side. As shown in FIG. 25, the shutter 33 is provided with a cylindrical portion 33*a* to be fitted on the outer periphery of an output shaft 3, an open/close plate 33*b* formed in a flat plate shape extending forward from the underside of the cylindrical portion 33*a*, and two support arms 33*c* extending backward from both right and left sides of the cylindrical portion 33*a* while passing sideways of the pinion 4. Further, as shown in FIG. 24, each support arm 33*c* is provided at the rear end thereof with a boss portion 33*d* extending toward the output shaft 3, with an engaging pin 33*e* being press-fitted into the boss portion 33*d* in such a manner that the front end of the engaging pin 33*e* is projecting toward the output shaft 3 from the end face of the boss portion.

A rear wall surface of the shutter 33 where the cylindrical portion 33*a* is formed is in abutment with the front end face of the pinion 4, and in this state the shutter 33 is urged backward (rightward in FIG. 23) by means of a spring 32 disposed between it and the housing 12. Therefore, when the pinion 4 advances on the output shaft 3 during operation of the starter, the shutter 33 moves forward against the biasing force of the spring 32 while being pushed forward by the pinion 4, and when the pinion 4 is released from its retreat-restriced state, the shutter is pushed back (to its initial position shown in FIG. 23) together with the pinion 4 by virtue of the spring 32.

The spring 32 is disposed on the outer periphery of the output shaft 3, and one end thereof is engaged with a stepped face formed in a bearing portion 12*a* of the housing 12, while the opposite end thereof is engaged with an annular groove 33*f* (see FIG. 25) formed in the circumference of the cylindrical portion 33*a* of the shutter 33.

The retreat restricting member 5 is formed in about the same shape as in the third embodiment. Holes 5*j* formed in fulcrum portions 5*i* are each fitted in a support pin 54 fixed to a center case, and engaging pins 33*e* press-fitted in the rear end portions of the support arms 33*c* of the shutter 33 are fitted in elongated holes 5*k* formed in side wall portions 5*r*. In this way the retreat restricting member 5 is mounted and it is rotatable about the support pin 54.

A rotation restricting member 6 used in this embodiment is formed generally in the same shape as in the third embodiment. It has a rotation restricting bar 6*b* which comes into engagement with a recess 34*a* of the rotation restricting plate 34 in the initial stage of operation of the starter to restrict the rotation of the pinion 4.

(Operation of Fourth Embodiment)

The operation of this embodiment will be described below.

When a starting switch is turned on to operate a magnet switch, the rotation restricting bar 6*b* of the rotation restricting member 6 comes into engagement with a recess 34*a* of the rotation restricting plate 34 to restrict the rotation of the pinion 4.

On the other hand, as the output shaft 3 rotates under the rotating force of the starter motor, the rotation-restricted pinion 4 advances along the helical spline on the output shaft 3 and the pinion gear 4*a* comes into mesh with a ring gear to start up the engine.

At this time, the shutter 33 moves forward with advance motion of the pinion 4, so that the retreat restricting member 5 is pulled up axially about the support pin 54 while the engaging pins 33*e* press-fitted in the rear end portions of the support arms 33*c* and the elongated holes 5*k* formed in the side wall portions 5*r* are engaged with each other.

As to the rotation restricting member 6, the front end of the rotation restricting bar 6*b* is disengaged from the recess 34*a* of the rotation restricting plate 34 upon complete mesh of the pinion gear 4*a* with the ring gear and falls toward the rear end side of the thrust ring 36, so that as soon as the pinion 4 is released from its rotation restricted state, the front end of the rotation restricting bar 6*b* supports the rear end of the retreat restricting member 5, whereby the posture of the retreat restricting member 5 which has been pulled and raised up in the axial direction by the shutter 33 is retained.

Therefore, even when the pinion 4 is rotated by the ring gear and a retreating force is exerted on the pinion 4, the retreat of the pinion can be inhibited by cooperation of both retreat restricting member 5 and rotation restricting member 6.

Thereafter, with the starting switch turned off, the rotation restricting member 6 is returned to its initial position by the biasing force of a return spring (not shown), whereby the front end of the rotation restricting bar 6*b* is disengaged from the rear end of the retreat restricting member 5 to release the retreat restriction of the pinion 4. Consequently, the shutter 33 and the pinion 4 are pushed back to their initial positions by virtue of the spring 32, whereby the retreat restricting member 5 also reverts to its rest state (the state shown in FIG. 23).

(Advantages of Fourth Embodiment)

According to the structure of this embodiment, since the retreat restricting member 5 is connected to the shutter 33 which is a non-rotatable member and is thereby prevented from follow-up rotation with the pinion 4, the rotating force of the pinion is not applied to the rotation restricting bar 6*b* and hence it is unlikely that the bar 6*b* will be bent or subject to wear. Besides, a deflected load is never imposed on the pinion 4 through the retreat restricting member 5, so that the pinion 4 does not tilt relative to the output shaft 3 and hence the reliability of the starter can be improved.

(Fifth Embodiment)

A fifth embodiment of the present invention will be described below with reference to FIGS. 26 to 30(*a*) through 30(*c*). A rotation restricting member 6 is constructed in the same manner as in the third embodiment.

A starter according to this embodiment, indicated by numeral 1, is different in the structure of the pinion retreat restricting mechanism from the other embodiments, which difference will be described below. The components having the same functions, (the same names), as in the other embodiments are indicated by the same reference numerals and explanations thereof will be omitted for brevity.

Figure 26:
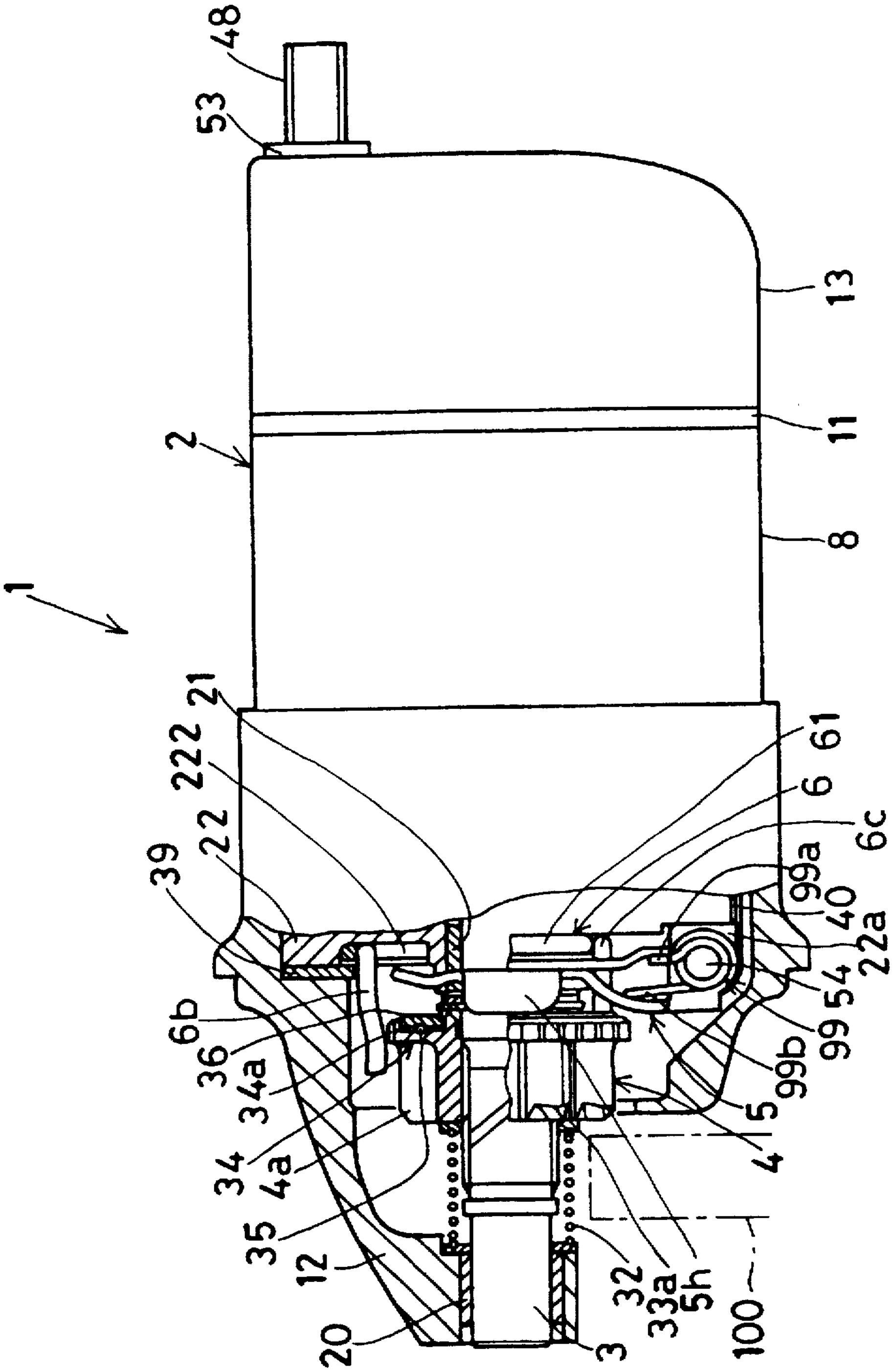
FIG. 26 is an axial sectional view of a main part of a starter in a rest state in a fifth embodiment of the invention.
Figure 27:
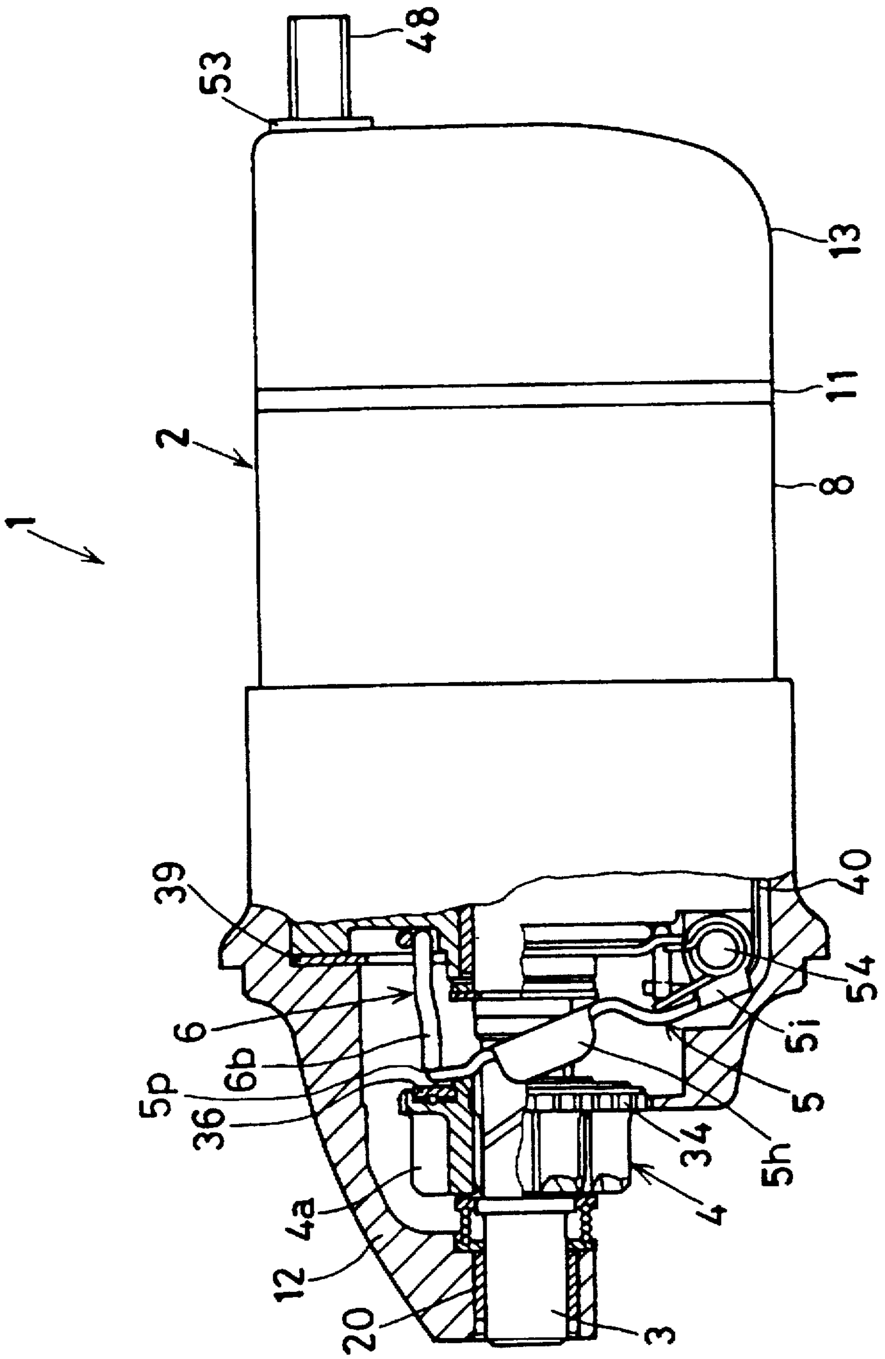
FIG. 27 is an axial sectional view of the main part of the starter in a meshed state in the fifth embodiment.
Figure 28:
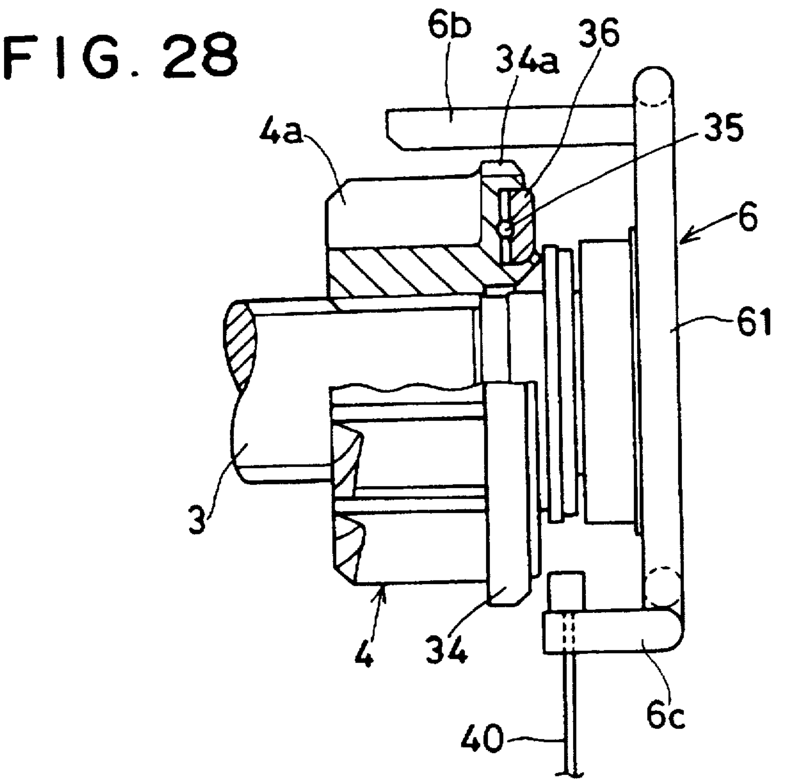
FIG. 28 is an enlarged sectional view of the pinion and other components disposed thereabouts except a retreat restricting member in a rest state of an output shaft in the fifth embodiment.

FIG. 26 shows a retreated (rest) state of the pinion and FIG. 27 shows an advanced (meshed) state of the pinion.

A rotation restricting member 6 is formed in about the same shape as that in the third embodiment and is disposed within a space formed between a center case 22 and a plate 39 so that a rotation restricting bar 5*b* and a cord-like member engaging portion 6*c* are extended forward from the plate 39 so that the rotation restricting member 6 can move vertically (upward and downward directions in FIG. 26) through the space. On the plate 39 is disposed a return spring 8A for urging the rotation restricting member 6 to its initial position (upward in FIG. 29). The return spring 8A comprises a coil portion 82 whose proximal portion 81 is retained in an obliquely downward position on the front face of the plate 39, and an operating end portion 83 extending at right angles to the axial direction from the front end of the coil portion 82 toward the cord-like member engaging portion 6*c*. The operating end portion 83 urges the cord-like engaging portion 6*c* nearly upward by virtue of the repulsive force of the coil portion 82, whereby the rotation restricting member 6 is set to an upper position (i.e. initial position) when electric power to the magnet switch is kept off. On the other hand, when the electric power is applied to the magnet switch, a plunger causes the rotation restricting member 6 to move down through the cord-like member 40.

Figure 30A:
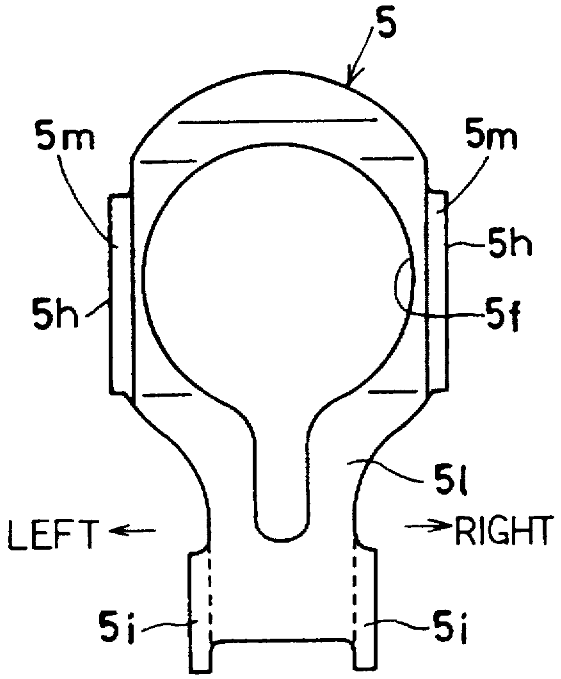
FIGS. 30(*a*), 30(*b*) and 30(*c*) are respectively a front view of the retreat restricting member, a side view thereof, and a plan view as seen from the bottom in the fifth embodiment.
Figure 30B:
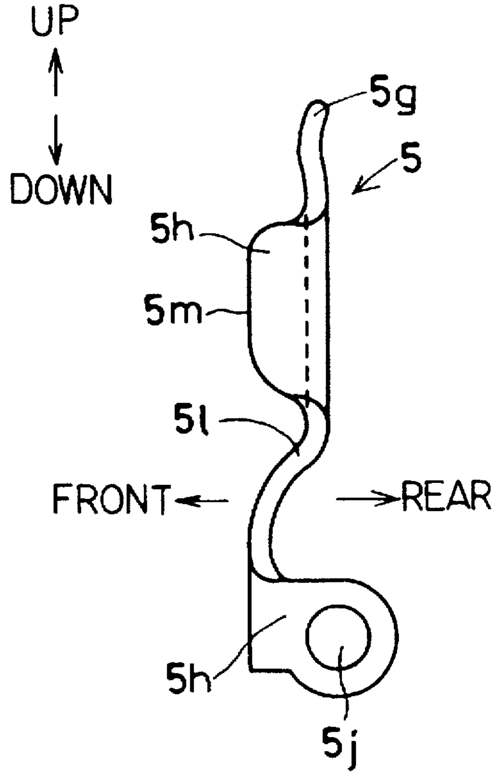
Figure 30C:
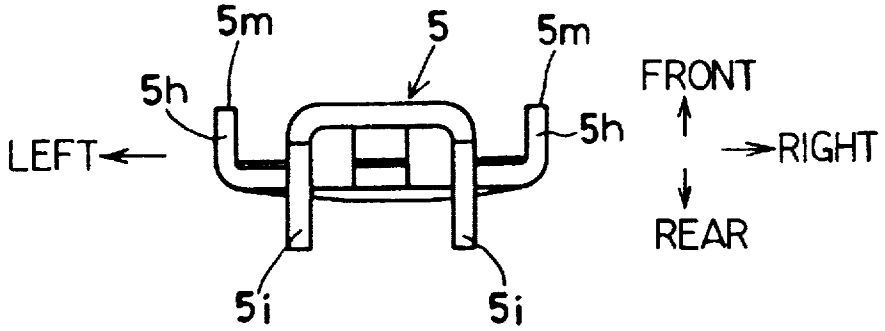
Figure 31:
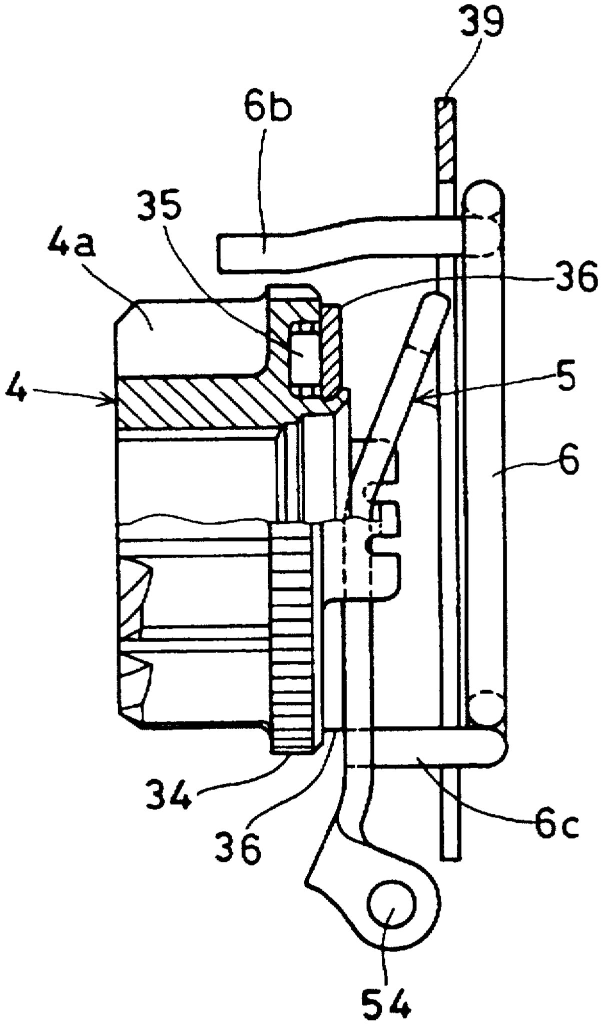
FIG. 31 is a side view showing an operating state of a retreat restricting member and that of a rotation restricting member in a sixth embodiment of the invention.

Description is further directed to the retreat restricting member 5 with reference to FIGS. 26 and 30(*a*) through 30(*c*).

As shown in FIGS. 30(*a*) through 30(*c*), the retreat restricting member 5 comprises fulcrum portions 5*i* each supported pivotably by a support pin 54, a pivotable portion 51 extending above the support pin 54 from the fulcrum portions 5*i*, and side wall portions 5*r* formed separately on the right and left sides of the pivotable portion 51. The retreat restricting member 5 is formed by sheet metal working. The fulcrum portions 5*i* are formed by cutting out a pair of right and left portions integrally with the pivotable portion 51 and then bending the right and left portions at right angles to the the pivotable portion 51. The fulcrum portions 5*i* are each formed with a hole 5*j* for insertion therethrough of a support pin 54. Centrally of the pivotable portion 51 is formed with a hole 5*f* through which is inserted the output shaft 3. Further, a pair of side wall portions 5*r* are bent in a direction opposite and orthogonal to the pivotable portion 51 from the right and left ends of the pivotable portion 51. Abutment faces 5*m* of the paired side wall portions 5*r* can abut the rear end face of thrust ring 36. An annular portion 5*g* located above the pivotable portion 51 is bent slightly backward with respect to the main portion of pivotable portion 51. The front end of the rotation restricting bar 6*b* comes into contact with the rear end face of the annular portion 5*g* to inhibit a backward pivotal motion of the annular portion.

Wound around the support pin 54 is a retreat restricting member urging spring 99 which serves as an urging means for the retreat restricting member 5. A base end portion 99*a* of the spring 99 is anchored to the plate 39, while an operating end portion 99*b* thereof urges the pivotable plate portion 51 of the retreat restricting member 5 forward, whereby the side portions 5*h* of the retreat restricting member 5 are normally pressed against the rear end face of the thrust ring 36.

Figure 29:
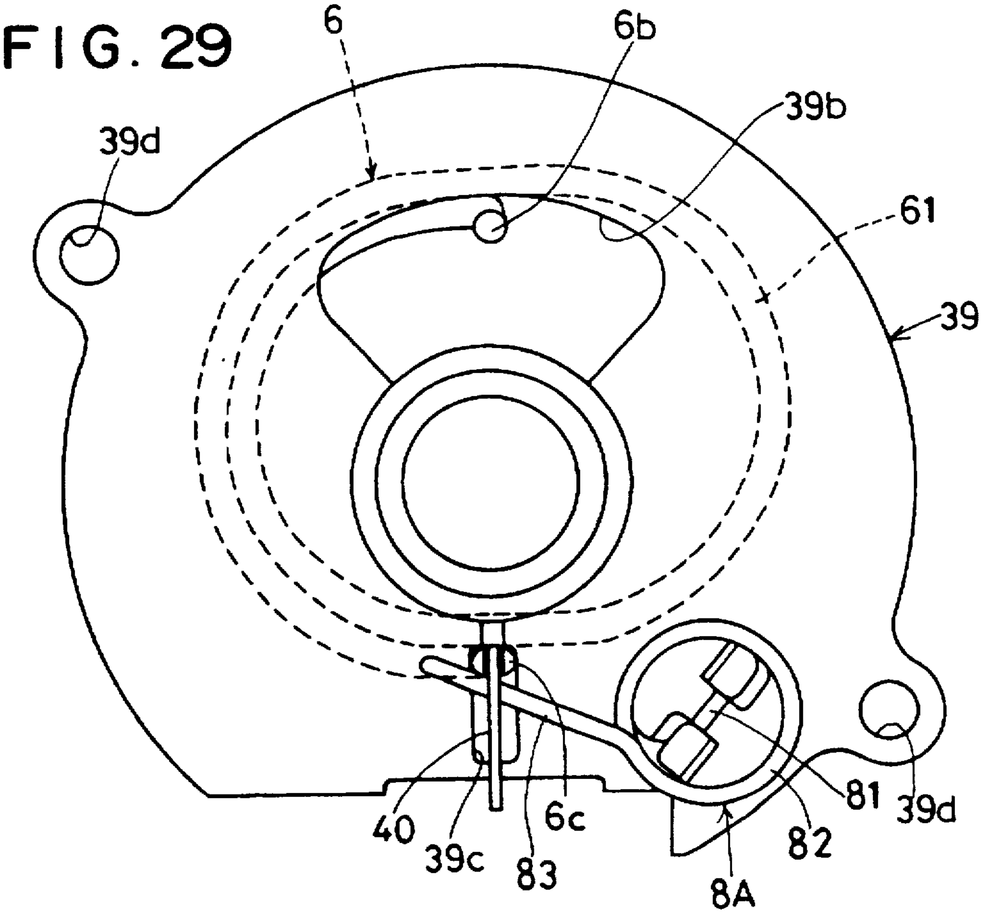
FIG. 29 is a front view showing a plate and other components disposed thereabouts in the fifth embodiment.

As shown in FIG. 29, the plate 39 covers the opening of a rotation restricting member guide slot 222 formed in the center case 22 to prevent a ring portion 61 of the rotation restricting member 6 from coming off the guide slot 222. A large window 39*c* through which the rotation restricting bar 6*b* projects forward is formed centrally in the right and left direction at the upper portion of the plate 39, while a small window 39*e* through which the cord-like member engaging portion 6*c* projects forward is formed centrally in the right and left direction at the lower portion of the plate 39. Into a hole 39*d* in FIG. 29 is inserted a through bolt (not shown) for coupling together a housing 12 and an end cover 13 with a starter motor 2 held therebetween.

Centrally in the transverse direction at the lower portion of the center case 22 is provided with a roller supporting wall 22*a* in a forwardly projecting state, and a support pin 54 is press-fitted transversely into the roller supporting wall 22*a*. A roller (not shown) for angular change of the cord-like member 40 is supported rotatably by the support pin 54.

(Operation of Fifth Embodiment)

The operation of this embodiment will be described below.

When a starting switch is turned on and a magnet switch 7 operates, the rotation restricting member 6 moves downward and the rotation restricting bar 6*b* comes into engagement with a recess 34*a* of the rotation restricting plate 34 for the pinion 4, whereby the rotation of the pinion 4 is restricted.

On the other hand, as the output shaft 3 rotates under the rotating force of the starter motor 2, the rotation-restricted pinion 4 advances along the helical spline on the output shaft 3 and the pinion gear 4*a* comes into mesh with a ring gear. With advance motion of the pinion 4, the retreat restricting member 5 moves pivotally about the support pin 54 while the front end faces 5*m* of the side wall portions 5*r* are kept in abutment with the thrust ring 36 under the biasing force of the retreat restricting member urging spring 99.

When the pinion gear 4*a* advances by a predetermined distance in mesh with the ring gear, the rotation restricting bar 6*b* of the rotation restricting member 6 falls into the space behind the thrust ring 36 to release the rotation-restricted state of the pinion 4, and thereafter the front end of the rotation restricting bar 6*b* comes into abutment with the rear end face of the circular portion 5*g* (see FIG. 27). The rotation of the output shaft 3 is transmitted through the pinion 4 to the ring gear for start-up of the engine.

With the pinion 4 advanced and the pinion gear 4*a* meshing with the ring gear, the urging force of the spring 32 disposed on the front end side of the pinion 4 becomes large. Further, when the pinion 4 is rotated by the ring gear after start-up of the engine, the rotating force of the engine works on the direction to retreat the pinion 4 under the action of the helical spline, so that the pinion 4 tends to retreat with respect to the output shaft 3. As mentioned above, however, the retreat of the pinion 4 is restricted by the rotation restricting member 6 through the retreat restricting member 5 which is in abutment at the two abutment faces 5*m* with the thrust ring 36 on the pinion 4, and thus disengagement thereof from the ring gear is prevented.

Thereafter, when the starting switch is turned off, the rotation restricting member 6 returns to its initial position (see FIG. 26) by virtue of the return spring 8A. As a result, the pinion 4 which undergoes a retreating force from the ring gear moves back to its initial position (see FIG. 26).

In this embodiment there can be attained the same effects as in the third embodiment.

(Sixth Embodiment)

A sixth embodiment of the present invention will be described below with reference to FIGS. 31 to 35. A rotation restricting member 6 is constructed in the same manner as in the third embodiment.

The sixth embodiment is different from the fifth embodiment in the shape of a retreat restricting member 5 and that of a thrust ring 36 in the pinion retreat restricting mechanism, which difference will be described below. The components having the same functions, (the same names), as in the other embodiments are indicated by the same reference numerals and explanations thereof will be omitted for brevity.

Figure 32A:
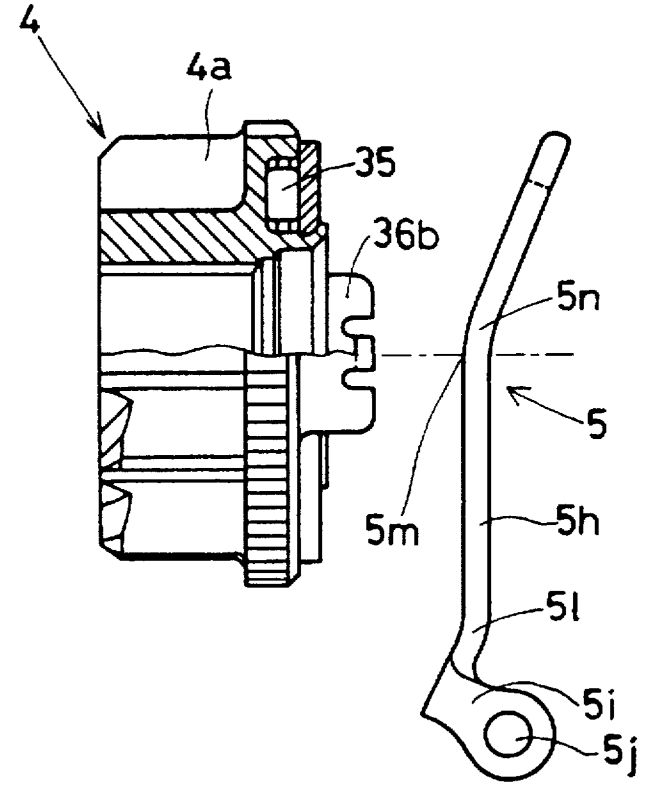
FIGS. 32(*a*) and 32(*b*) are respectively a partially exploded view of a pinion retreat restricting mechanism and a side view thereof in the sixth embodiment.
Figure 32B:
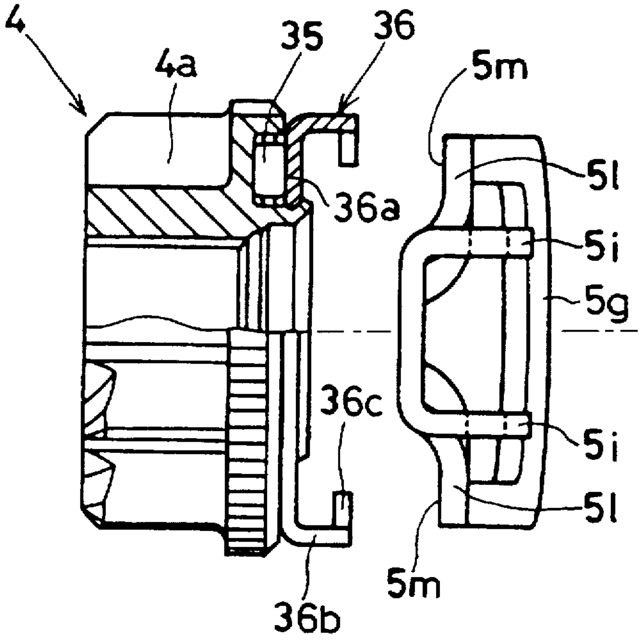
Figure 33A:
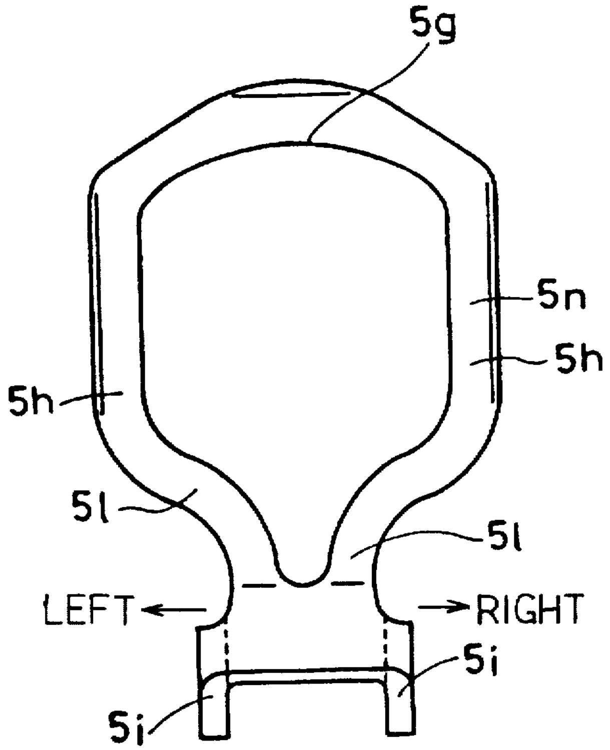
FIGS. 33(*a*), 33(*b*) and 33(*c*) are respectively a front view of the retreat restricting member, a side view thereof, and a plan view as seen from the bottom in the sixth embodiment.
Figure 33B:
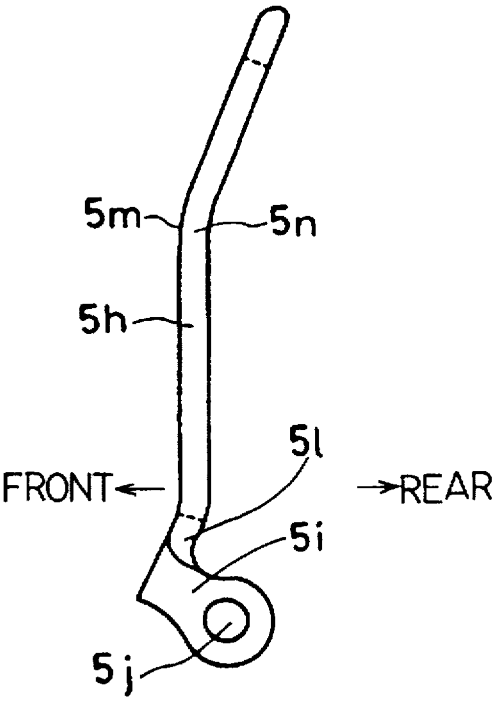
Figure 33C:
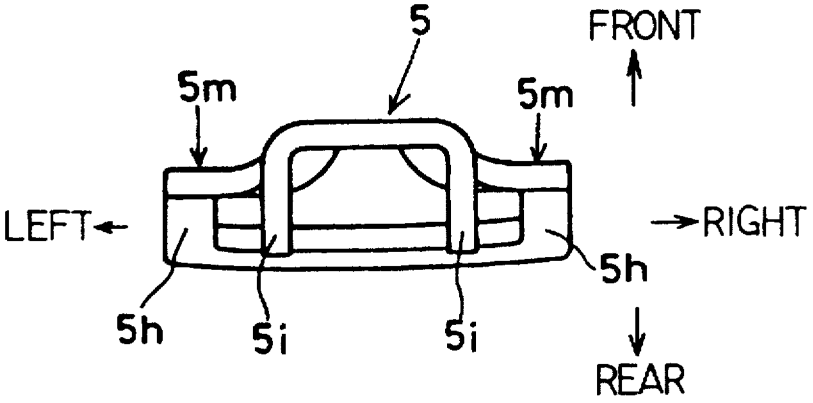
Figure 34:
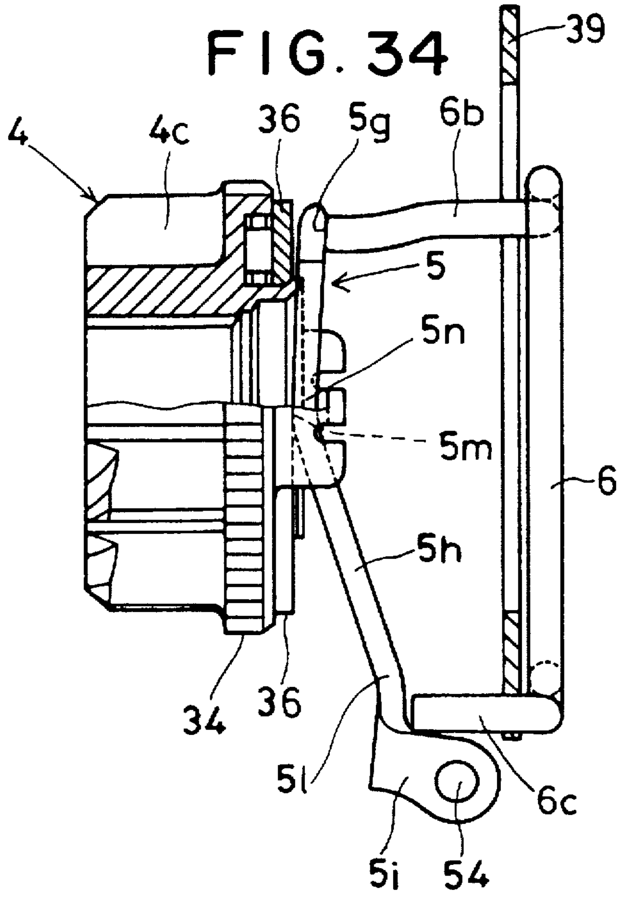
FIG. 34 is a side view showing an operating state of the retreat restricting member and that of the rotation restricting member in the sixth embodiment.

As shown in FIGS. 32(*a*) and 32(*b*), the retreat restricting member 5 (arm member in the present invention) is composed of support portions 5*i* each supported pivotably by a support pin 54, a pivotable member 51 extending above the support pin 54 from the support portions 5*i*, a pair of side portions 5*h* provided integrally with the pivotable member 51 and extending further upward from the pivotable member 51, a pair of bent portions 5*n* which are formed respectively on the paired side portions 5*h* and bent oppositely to the pinion side, and an annular portion 5*g* which connects the paired side portions 5*h*.

The paired side portions 5*h* can abut the rear end faces of thrust ring 36. The front end of the rotation restricting bar 6*b* of the rotation restricting member 6 comes into contact with the rear end face of the annular portion 5*g* to inhibit a backward pivotal motion of the annular portion.

The thrust ring 36 used in this embodiment is made up of a fixed portion 36*b* which is engaged rotatably relative to the pinion 4 and axially movably in an integral manner through a thrust bearing 35, a pair of projecting portions 36*c* (first projecting portion in the present invention) projecting from the fixed portion 36*b*, and a pair of holding portions 36*d* (second projecting portion in the present invention) respectively projecting radially inwardly from the paired projecting portions 36*c* toward the axis center of the pinion 4 to hold the paired side portions 5*h* of the retreat restricting member 5. In the space defined by the fixed portion 36*b*, paired projecting portions 36*c* and paired engaging portions 36*d*, disposed are the paired side portions 5*h* of the retreat restricting member 5 so that the retreat restricting member 5 moves through the space as the pinion 4 moves on the output shaft (not shown).

(Operation of Sixth Embodiment)

The following description is now provided about the operation of this embodiment.

With a starting switch turned on to operate the magnet switch (not shown), the rotation restricting member 6 is moved downward by a cord-like member (not shown) engaged with the cord-like member engaging portion 6*c* of the rotation restricting member 6, and the rotation restricting bar 6*b* comes into engagement with a recess 34*a* of the rotation restricting plate 34 to restrict the rotation of the pinion 4.

On the other hand, when the output shaft rotates under the rotating force of the starter motor (not shown), the pinion 4 now in a rotation-restricted state advances along the helical spline on the output shaft and the pinion gear 4*a* comes into mesh with the ring gear (not shown). With the advance motion of the pinion 4 the retreat restricting member 5 moves within the space surrounded by the fixed member 36*b*, paired projecting portions 36*c* and paired engaging portions 36*d* of the thrust ring 36, and the retreat restricting member 5 moves pivotally about the support pin 54 while abutting the paired engaging portions 36*d* of the thrust ring 36, whereby the retreat restricting member 5 is pulled toward the pinion 4. When the pinion gear 4*a* has advanced by a predetermined distance in mesh with the ring gear, the rotation restricting bar 6*b* of the rotation restricting member 6 falls into the space located behind the thrust ring 36 to release the rotation-restricted state of the pinion 4. Thereafter, the front end of the rotation restricting bar 6*b* comes into abutment with the rear end face of the annular portion 5*g* of the retreat restricting member 5 (see FIG. 34). Then, the rotation of the output shaft is transmitted through the pinion 4 to the ring gear to start up the engine.

Figure 35:
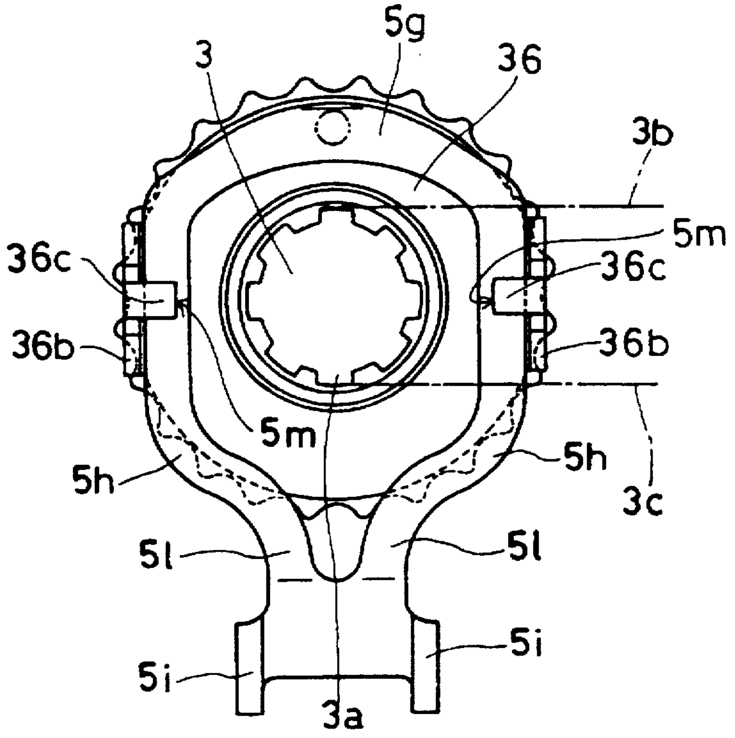
FIG. 35 is an explanatory view showing an advanced state of a pinion, as seen from a starter motor side, in the sixth embodiment.

With the pinion 4 advanced and the pinion gear 4*a* meshing with the ring gear, the urging force of a spring disposed on the front end side of the pinion becomes large. Further, when the pinion 4 is rotated by the ring gear after start-up of the engine, the rotating force of the engine works on the direction to retreat the pinion 4 under the action of the helical spline, so that the pinion 4 tends to retreat with respect to the output shaft. However, as noted previously, the retreat of the pinion 4 is restricted by the rotation restricting member 6 through the retreat restricting member 5 which is in abutment at the two abutment faces 5*m* with the thrust ring 36 on the pinion 4, and thus the disengagement thereof from the ring gear is prevented (see FIGS. 34 and 35). It is to be noted that FIG. 35 shows the state in which the retreat restricting member 5 is restricting the retreat of pinion 4, as viewed from the side of starter motor 2 as in FIG. 34. The abutting face 5*m* (first abutting portion in the present invention) is in abutment with the thrust ring 36 at positions which are between the first and second parallel tangential lines 3*b* and 3*c* tangential to the outer circumference of the helical spline 3*a* of the output shaft 3 and opposing to each other with respect to the output shaft 3.

Thereafter, when the starting switch is turned off, the rotation restricting member 6 returns to its initial position (see FIG. 31) by virtue of a return spring (not shown) engaged with the cord-like member engaging portion 6*c* of the rotation restricting member 6. As a result, the pinion 4 which undergoes a retreating force from the ring gear retreats to its initial position (see FIG. 31).

(Advantages of Sixth Embodiment)

In this embodiment there can be obtained the same effects as in the fifth embodiment.

Further, with movement of the pinion 4 the rotation restricting member 6 can move generally radially while supported axially within the holding portions 36*d* of the thrust ring 36 mounted on the pinion 4. Therefore, for moving to a position for restricting the retreat of the pinion 4, it is not necessary to use any separate member for moving together with the pinion 4. As a result, with a simple structure it is possible to move the rotation restricting member 6 to the position for restricting the retreat of the pinion 4.

Furthermore, the thrust ring 36 has the paired projecting portions 36*c* respectively projecting from the fixed portion 36*b* to the opposite side of the pinion 4, and the paired engaging portions 36*d* respectively projecting radially inwardly from the paired projecting portions 36*c* toward the axis center of the pinion 4. Therefore, the retreat restricting member 5 while being kept axially supported can move in a generally radial direction within the space formed by the holding portions 36*c* and 36*d* of the thrust ring 36 and drive easily the rotation restricting member 6 to the position for restricting the retreat of the pinion 4.

The rotation restricting member 6 can be mounted by simply being inserted (slided) into the space.

Moreover, the paired bent portions 5*n* which are bent toward the opposite side of the pinion 4 are provided on the paired side portions 5*h* respectively extending from the support portion 5*i*, so that the bent portion 5*n* works as the abutting face 5*m* relative to the pinion 4. Therefore, even when the inclination of the retreat restricting member 5 relative to the center case 22 is not fixed, the paired bent portions 5*n* abut the pinion 4 in a generally straight line and, as a result, restriction on the retreat of the pinion can be performed stably.

[Modifications]

Although in each of the above-described embodiments the rotation restricting member 6 is driven by the magnet switch 7 through the cord-like member 40, a small-sized motor may be used for the same purpose in place of the magnet switch 7. Further, the connecting member need not be the cord-like member but may be a rod-like member such as a lever or link mechanism.

Although in each of the above embodiments the thrust ring 36 is supported at two points by the retreat restricting member 5, there may be adopted a three- or more-point support structure. In this case, however, in order to prevent tilting of the pinion 4 relative to the output shaft 3, it is necessary that the axis of the pinion be present within a polygon formed by connecting the support points.

Although the retreat restricting member 5 obtained by sheet metal working is used in each of the above embodiments, there may be used a resin molded product or the like.

Although in each of the above-described first to fourth embodiments the retreat restricting member 5 and the thrust ring 36 are connected by a coupling structure, both may be attracted together using a magnet or the like and be allowed to slide.

According to the structure of the starter 1 described in each of the above embodiments, only the pinion 4 advances with respect to the output shaft 3, there may be adopted a structure wherein a one-way clutch (the movable cylindrical member in the present invention) is helical-splined in the outer periphery of the output shaft 3 and the pinion 4 is integrally provided on the front-end side of the one-way clutch.

Each starter 1 described hereinabove is so constructed as that the pinion 4 is advanced by an operation of the helical spline 3*a* on the output shaft and the rotating force of the starter motor 2 while restricting the rotation of pinion 4 formed with the pinion gear 4*a*. It is however possible to use the pinion retreat restricting mechanism according to the invention in the inertia engagement type starters in which a pinion is advanced at the rise of starter motor rotation by the use of the inertia of pinion.

Further, although in each of the above-described second to sixth embodiments the moving direction of the retreat restricting member 5 and the operating direction of the rotation restricting member 6 as the posture holding means are nearly orthogonal to each other, both directions are not limited to such orthogonal directions. It is possible that if both directions are not the same direction, the load imposed on the posture holding means becomes a component of force and hence smaller than in direct drive in the same direction and that the force generated from the drive source (e.g. electromagnet switch) can be diminished accordingly (of course, in the case where both directions are orthogonal to each other, the component of force is zero and no force is exerted on the drive source).

The present invention having been described above is not limited to the disclosed embodiments but may be modified further without departing from the spirit and scope of the invnetion.

What is claimed is:

1. A starter comprising:

a starter motor;

an output shaft driven by said starter motor and having a helical spline on an outer circumference thereof;

a movable cylindrical member having a pinion gear for meshing with a ring gear of an engine and engaged with said helical spline of said output shaft, said movable cylindrical member being capable of advancing and retreating axially along said helical spline of said output shaft;

rotation restriction means adapted to come into abutment with said movable cylindrical member to restrict a rotation of said movable cylindrical member, thereby causing said movable cylindrical member to advance by virtue of both a rotating force of said starter motor and an action of said helical spline;

drive means for moving said rotation restriction means to a position of abutment with said movable cylindrical member;

retreat restricting means for restricting a retreat of said movable cylindrical member in an advanced state of said pinion gear by a predetermined distance in mesh with said ring gear; and a first abutting portion formed on said retreat restricting means to abut said movable cylindrical member at locations which are between a first and second parallel tangential lines tangential to an outer circumference of said helical spline of said output shaft and opposing to each other with respect to said output shaft as a center.

2. A starter according to claim 1, wherein:

said first abutting portion of said retreat restricting means abuts said movable cylindrical member at two locations which are generally symmetrical to each other with respect to an axis center of said movable cylindrical member.

3. A starter comprising:

a starter motor;

an output shaft driven by said starter motor and having a helical spline on an outer circumference thereof;

a movable cylindrical member having a pinion gear for meshing with a ring gear of an engine and engaged with said helical spline of said output shaft, said movable cylindrical member being capable of advancing and retreating axially along said helical spline of said output shaft;

rotation restriction means adapted to come into abutment with said movable cylindrical member to restrict a rotation of said movable cylindrical member, thereby causing said movable cylindrical member to advance by virtue of both a rotating force of said starter motor and an action of said helical spline;

drive means for moving said rotation restriction means to a position of abutment with said movable cylindrical member;

retreat restricting means for restricting a retreat of said movable cylindrical member in an advanced state of said pinion gear by a predetermined distance in mesh with said ring gear; and a first abutting portion formed on said retreat restricting means at least at three locations to abut said movable cylindrical member, an axis center of said movable cylindrical member being disposed in a polygonal shape defined by connecting said first abutting portion.

4. A starter according to any one of claims 1 to 3, further comprising:

a rotatable member mounted between said movable cylindrical member and said retreat restricting means and rotatable relative to said movable cylindrical member.

5. A starter according to any one of claims 1 to 3, further comprising:

a posture holding means for holding a posture of said retreat restricting means at a time of retreat of said movable cylindrical member, wherein the retreat of said movable cylindrical member is restricted by both said retreat restricting means and said posture holding means.

6. A starter according to claim 5, wherein:

said posture holding means is disposed in a space between said retreat restricting member and a stationary member provided closer to a starter motor side than said retreat restricting means.

7. A starter according to claim 5, further comprising:

a second abutting portion formed at one end of said retreat restricting means for abutment with said posture holding means; and a pivotal support portion formed on the other end of said retreat restricting means and supported pivotably by a stationary member disposed at a starter motor side, wherein said first abutting portion is disposed between said one end and said the other end.

8. A starter according to claim 5, wherein:

said rotatable member mounted on said movable cylindrical member has holder portions for holding said retreat restricting means axially; and said retreat restricting means moves freely, with movement of said movable cylindrical member, around a fulcrum portion provided on said stationary member as a fulcrum in a generally radial direction within said holder portion.

9. A starter according to claim 5, wherein:

said rotation restriction means serves also as said posture holding means.

10. A starter according to claims 8, wherein:

said holder portion of said rotatable member includes a pair of first protruding portions respectively protruding from said rotatable member toward a side opposite to said movable cylindrical member, and a pair of second protruding portions respectively protruding from said pair of first protruding portions toward the axis center of said movable cylindrical member; and said retreat restricting means includes a pair of side piece portions respectively extending from said support portion and having a pair of bent portions bent toward an opposite side of said movable cylindrical member.

11. A starter according to claim 1, wherein:

said retreat restricting means includes;

an arm member mounted rotatably around said output shaft with respect to said movable cylindrical member with one end thereof engaging said movable cylindrical member rotatably on both sides corresponding to generally symmetric positions with respect to an axis of said movable cylindrical member and being raised up in an axial direction with movement of said movable cylindrical member, and with the other end abutting said stationary member provided closer to a starter motor side than said movable cylindrical member and disposed between said movable cylindrical member and a stationary member, and an arm posture holding member for moving to a position for engagement with the other end of said raised arm member to hold a posture of said arm member.

12. A starter according to claim 11, wherein:

said arm member, by being raised axially by the advance of said movable cylindrical member, slides over the stationary member and comes into said output shaft in an axial direction side; and said arm member has a third abutting portion for abutment with said arm posture holding member, whereby abutment of said arm posture holding member with said third abutting portion restricts said arm member from being pushed radially outside of said output shaft.

13. A starter according to claim 12, wherein:

said arm posture holding member operates in a direction which crosses the direction in which said arm member is pushed radially outside of said output shaft to restrict a retreat of said arm member.

14. A starter according to any one of claims 1 to 3, wherein:

said drive means uses as a power source an electromagnet switch for controlling the supply of electric power to said starter motor.

15. A starter according to claim 1 or 3, wherein:

said drive means drives said restriction means through a connecting member.

16. A starter according to claim 14, wherein:

said electromagnet switch is disposed behind said starter motor.

17. A starter comprising:

a starter motor;

an output shaft driven by said starter motor and having a helical spline on an outer circumference thereof;

a movable cylindrical member having a pinion gear for meshing with a ring gear of an engine and engaged with said helical spline of said output shaft, said movable cylindrical member being capable of advancing and retreating axially along said helical spline of said output shaft;

rotation restriction means adapted to come into abutment with said movable cylindrical member to restrict a rotation of said movable cylindrical member, thereby causing said movable cylindrical member to advance by virtue of both a rotating force of said starter motor and an action of said helical spline;

drive means for moving said restriction means to a position of abutment with said movable cylindrical member; and retreat restricting means having a first and second restricting portions for restricting a retreat of said movable cylindrical member at positions which are between a first and second parallel tangential lines tangential to an outer circumference of said helical spline of said output shaft and opposing to each other with respect to said output shaft as a center, in an advanced state of said pinion gear by a predetermined distance in mesh with said ring gear.

18. A starter comprising:

a starter motor;

an output shaft driven by said starter motor and having a helical spline on an outer circumference thereof;

a movable cylindrical member having a pinion gear for meshing with a ring gear of an engine and engaged with said helical spline of said output shaft, said movable cylindrical member being capable of advancing and retreating axially along said helical spline of said output shaft;

rotation restriction means adapted to come into abutment with said movable cylindrical member to restrict a rotation of said movable cylindrical member, thereby causing said movable cylindrical member to advance by virtue of both a rotating force of said starter motor and an action of said helical spline;

drive means for moving said restriction means to a position of abutment with said movable cylindrical member; and retreat restricting means having a plurality of restricting portions at least at three locations for abutment with said movable cylindrical member in an advanced state of said pinion gear by a predetermined distance in mesh with said ring gear, an axis center of said movable cylindrical member being disposed in a polygonal shape formed by connecting said plurality of restricting portions.

19. A starter comprising:

a starter motor;

an output shaft driven by said starter motor and having a helical spline on an outer circumference thereof;

a movable cylindrical member having a pinion gear for meshing with a ring gear of an engine and engaged with said helical spline of said output shaft, said movable cylindrical member being capable of advancing and retreating axially along said helical spline of said output shaft;

retreat restricting means having a first and a second restricting portions for restricting a retreat of said movable cylindrical member, in an advanced state of said pinion gear by a predetermined distance in mesh with said ring gear, at locations which are between a first and a second parallel tangential lines tangential to an outer circumference of said helical spline of said output shaft and opposing to each other with respect to said output shaft as a center; and posture holding means for holding a posture of said retreat restricting means at a time of restricting a retreat of said movable cylindrical member, wherein the retreat of said movable cylindrical member is restricted by both said retreat restricting means and said posture holding means.

20. A starter comprising:

a starter motor;

an output shaft driven by said starter motor and having a helical spline on an outer circumference thereof;

a movable cylindrical member having a pinion gear for meshing with a ring gear of an engine and engaged with said helical spline of said output shaft, said movable cylindrical member being capable of advancing and retreating axially along said helical spline of said output shaft;

retreat restricting means having a plurality of restricting portions for restricting a retreat of said movable cylindrical member by abutting said movable cylindrical member at least at three locations in an advanced state of said pinion gear by a predetermined distance in mesh with said ring gear, an axis center of said movable cylindrical member being disposed in a polygonal shape defined by connecting said plurality of restricting portions; and posture holding means for holding a posture of said retreat restricting means at a time of restricting a retreat of said movable cylindrical member, wherein the retreat of said movable cylindrical member is restricted by both said retreat restricting means and said posture holding means.

* * * * *